United States Patent
Komiya et al.

(10) Patent No.: US 6,192,078 B1
(45) Date of Patent: Feb. 20, 2001

(54) MOTION PICTURE CONVERTING APPARATUS

(75) Inventors: Daisaku Komiya, Tokyo; Tsutomu Uenoyama, Kawasaki, both of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/033,087

(22) Filed: Mar. 2, 1998

(30) Foreign Application Priority Data

Feb. 28, 1997 (JP) .................................................... 9-060210

(51) Int. Cl.[7] ...................................................... H04N 7/32
(52) U.S. Cl. ................................ 375/240.16; 375/240.24
(58) Field of Search ............................ 348/384, 390–391, 348/400–403, 405, 407, 409–413, 415, 416, 420, 441, 699; 375/240, 240.03, 240.12–240.16, 240.2, 240.24; 382/232–236, 238, 248, 251; H04N 7/32

(56) References Cited

U.S. PATENT DOCUMENTS

| 5,475,434 | 12/1995 | Kim . | |
|---|---|---|---|
| 5,819,035 | * 10/1998 | Devaney et al. ...................... | 382/235 |
| 5,870,146 | * 2/1999 | Zhu ........................................ | 375/240 |
| 5,883,678 | * 3/1999 | Yamaguchi et al. .................. | 348/441 |
| 5,982,432 | * 11/1999 | Uenoyama et al. .................. | 348/391 |
| 5,987,179 | * 11/1999 | Rick et al. ............................ | 382/236 |
| 6,005,623 | * 12/1999 | Takahashi et al. ................... | 348/416 |
| 6,014,181 | * 1/2000 | Sun ........................................ | 348/699 |
| 6,081,295 | * 6/2000 | Adolph et al. ........................ | 348/405 |

FOREIGN PATENT DOCUMENTS

| 0697792 | 2/1996 | (EP) . |
|---|---|---|
| 4-181888 | 6/1992 | (JP) . |
| 9-098422 | 4/1997 | (JP) . |
| WO96/41482 | 12/1996 | (WO) . |

OTHER PUBLICATIONS

Feng J et al.: "Adaptive Block Matching Motion Estimation Algorithm For Video Coding" Electronics Letters, vol. 31, No. 18, 31 Aug. 31, 1995, pp. 1542/1543 XP000530941.

* cited by examiner

Primary Examiner—Richard Lee
(74) Attorney, Agent, or Firm—Pollock, Vande Sande & Amernick

(57) ABSTRACT

To perform a motion picture format conversion at high speed in a motion picture converting apparatus, the apparatus comprises: input device 101 for inputting a digital image signal constituted of blocks, each block being orthogonally transformed; a frame memory 102 for storing the digital image signal; block reading device 103 for reading the blocks or a macro block from the frame memory in response to a request; region dividing section controlling device 109 for sending a read request to the block reading device; component extracting device 104 for extracting a low-frequency component alone of the captured image signal; two low-resolution frame memories 105 for storing extracted information; motion detecting device 106 for detecting a motion in accordance with the information in the low-resolution frame memories; a region dividing section 113 including macro block classifying device 107 for labeling the macro block in response to a motion detection result by the motion detecting device and label storing device 114 for storing a label of the macro block; decoding device 110; an encoding section 111 for changing an encoding of the macro block in response to the label in the label storing device; and output device 112 for outward outputting the coded signal.

8 Claims, 18 Drawing Sheets

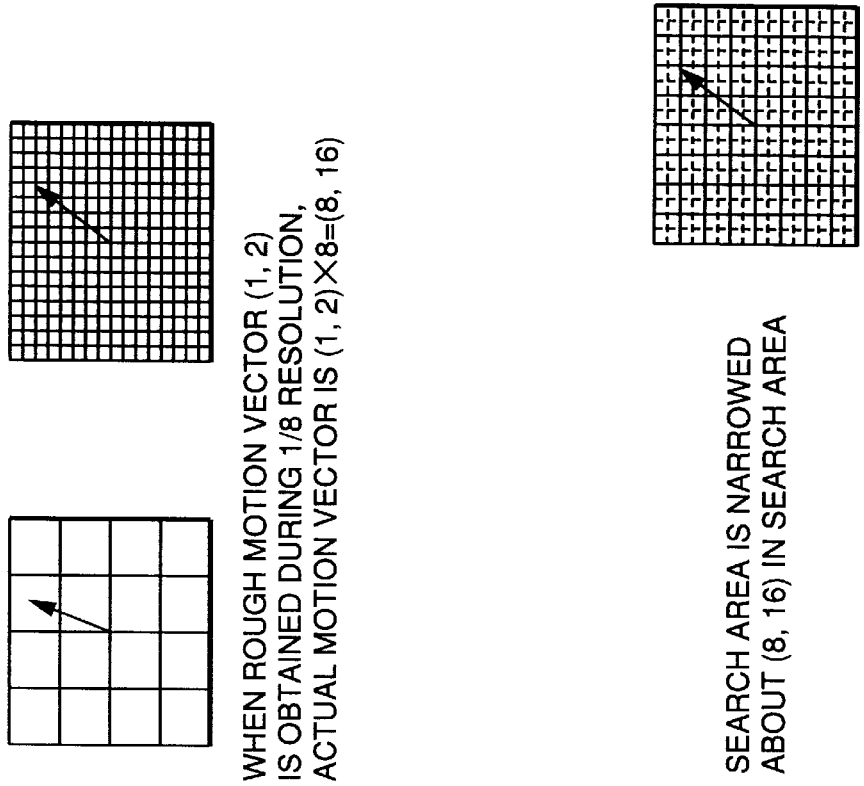
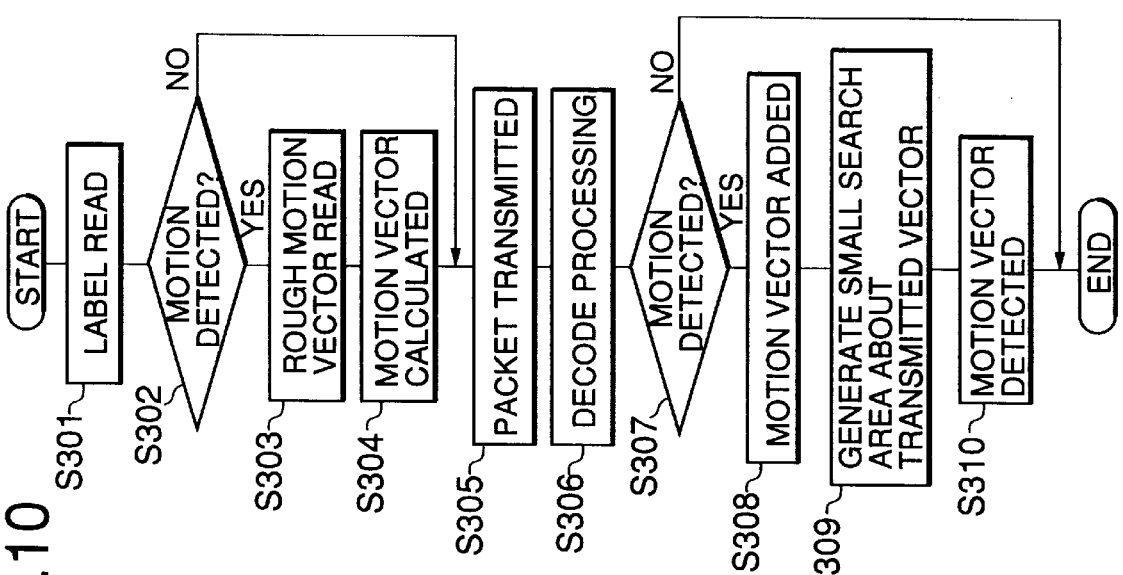

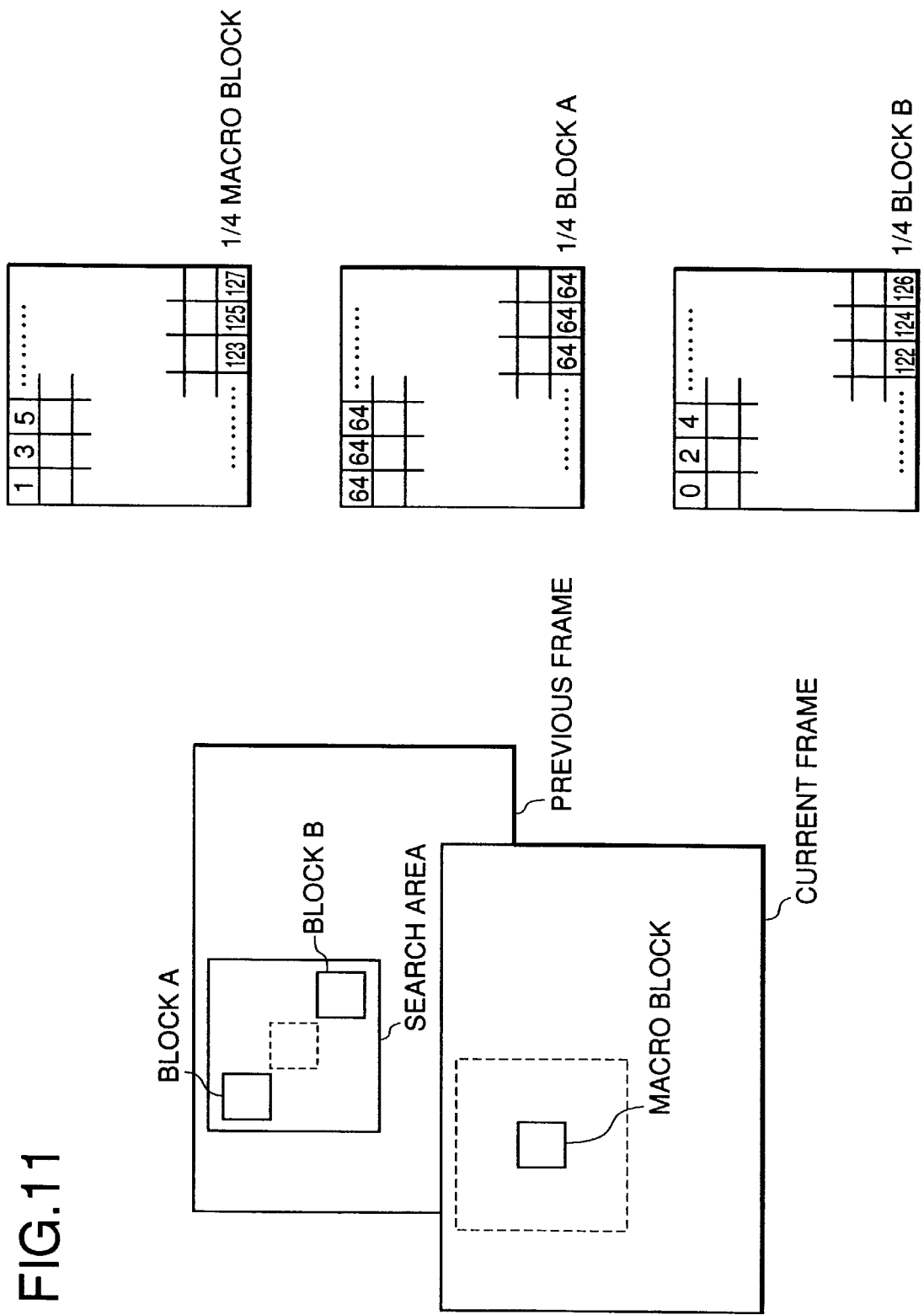

FIG.12
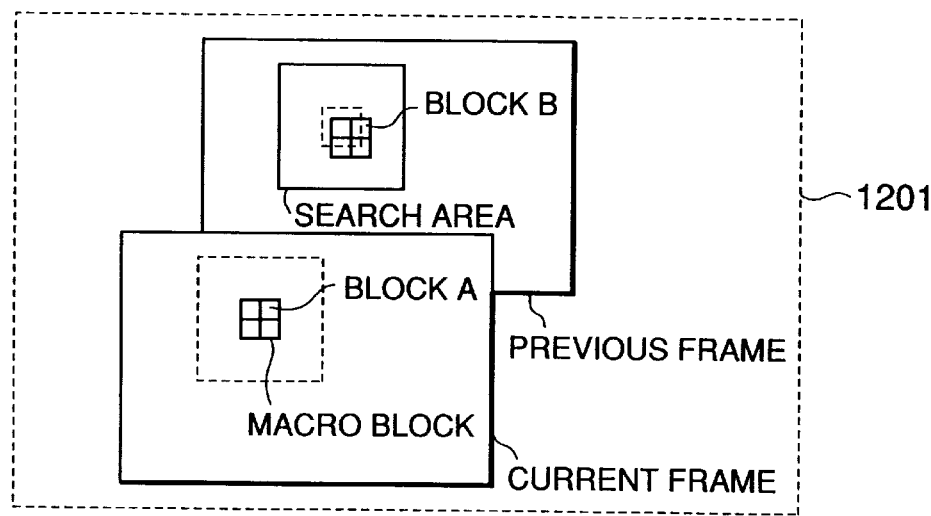
BLOCK A 
BLOCK B 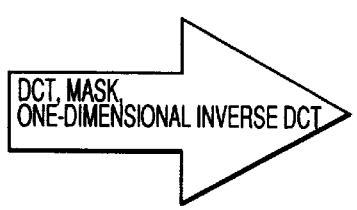

MOTION PICTURE CONVERTING APPARATUS

BACKGROUND OF THE INVENTION

1. Field of the Invention

The present invention relates to a motion picture converting apparatus for a motion picture compression format conversion. More specifically, it relates to a motion picture converting apparatus which is intended to improve a speed of a motion picture format conversion by reducing an amount of operation for a motion vector detection.

2. Description of the Prior Art

Recently, a digitization of a telecommunication technique has been advanced, and a plan is also in progress to digitize a current analog broadcasting system such as NTSC/PAL/SECAM. A new broadcasting service, which a digital technique is applied to, is a direct broadcasting by satellite for providing a multi-channel service, a ground wave broadcasting for a high definition television broadcasting (ATV: Advanced Television), a video on demand or the like. However, when such a motion picture is communicated by a digital signal, a common problem is a large amount of information. A motion picture image compression technique is essential in order to perform a real-time reproduction at a high frame rate and to suppress a traffic of a network.

In order to efficiently compress motion picture image data having a large amount of information, an approach for reducing redundancy by the use of a time-axis direction or a correlation in the time-axis direction is used. A typical approach is an MPEG (Motion Picture Image Coding Experts Group) system. This is discussed by ISO-IEC/JTC1/SC2/WG11 and is proposed as standards. In this system, adopted is a hybrid system of a combination of a motion compensating coding, a DCT (Discrete Cosine Transform) coding and a variable length coding (VLC). A constitution of a typical MPEG coding apparatus is shown in FIG. 15. A current frame is input to a motion vector detecting section and a subtracter. In the motion vector detecting section, the current frame is divided into rectangular blocks. By calculating the correlation between each block and a previous frame previously held in a frame memory, a motion vector is detected for each block. A predicted image generated by shifting the previous frame from the location of the current frame block to the point which the motion vector indicates is then input to the subtracter. In the subtracter, a differential image between the current frame and the predicted image is calculated. The differential image is then discrete-cosine transformed and quantized by DCT means and quantizing means respectively. The data is variable-length coded by variable length coding means and is then output outward. At this time, the motion vector detected by the motion vector detecting section is also coded by motion information coding means and is then output outward together with the data. At the same time that the quantized data is input to the variable length coding means, it is also input to inverse quantizing means. The data is restored into the differential image via inverse DCT means. In an adder, the current frame predicted image and the differential image are added to each other, so that the current frame is reconstituted. The reconstituted frame is stored in the frame memory in preparation for the subsequent frame coding.

In such a series of coding processing, it takes much of time for the motion vector detecting section to perform an operation. A study has been heretofore undertaken to reduce or simplify this processing. However, since this reduction or simplification is adapted in an equivalent manner to all macro blocks, a motion vector detection precision is deteriorated. The motion vector is defined so that the processing unit thereof may be set to the macro block (16×16 pixels). The macro block is classified into three types (Intra: the block itself is used because of a large motion; Non-MC coded: a simple difference between frames is operated because of less motion; and MC coded: a normal motion compensation) in accordance with the motion vector thereof. Known is a method disclosed in Japanese Patent Application Laid-open No. 4-181888 in which a block determining circuit is provided before the motion vector detecting section whereby the macro block is classified so that the processing is changed in response to a classifying result. However, when the motion is determined by this method, the block is compared to the block alone positioned in the macro block itself (corresponding to the motion vector 0) in the previous frame. The blocks are simply classified by whether or not there is motion. When a block is determination as having no motion, the motion detection is not performed for this block.

On the other hand, a digital VTR is one of important factors of a digital broadcasting communication technique as described above. An uncompressed digital VTR has been heretofore used as the digital VTR for a broadcasting station in the broadcasting station or the like. The digital VTR has an advantage in that it has a high quality and a deterioration is not noticeable during a dubbing. However, the digitization causes a problem in which recorded information is increased. Moreover, since the digital VTR is large-sized and expensive, it is less generally used. However, recently, advance in a band compression technique and improvement of recording density allow a small-sized/household digital VTR to be developed. A DVC (Digital Video Cassette) format standardized by HD digital VTR conference is used for this digital VTR. DVC data is characterized by the following manner. That is, the data is compressed in a spatial direction by the use of DCT, the data is then variable-length coded by Huffman coding. Although the DVC data has a large amount of information because of compression without the use of a time-direction correlation, it has the high quality and it is easily edited for each frame. Furthermore, since the DVC data is adapted so that it may be captured into a computer, it is expected that the DVC data is more frequently used in the future. In the system such as the video on demand for exchanging the motion picture image through the network, it is difficult to transmit/receive the DVC data at real time depending on a transmission performance of the network. In this case, the method, in which the motion picture image is stored as the DVC data and the data is converted into an image format such as MPEG when required, is effective in view of an effective use of a disk resource. Although a motion picture format conversion has been heretofore performed by the use of an exclusive hardware, it is desired that the motion picture format conversion is performed by the use of a software in consideration of an image quality, a cost, a flexibility toward various formats, a labor of implementing into a computer, a compatibility with the computer, an ease-to-distribute or the like.

However, there is a problem in which it takes a long processing time for the software to decode the DVC data and encode into MPEG at one time. In view of the above problem, it is an object of the present invention to reduce a load applied to a motion vector detection in MPEG encode and to improve a conversion speed of a motion picture conversion. As the prior-art motion vector detection processing, known is a method disclosed in Japanese Patent Application Laid-open No. 4-181888 in which a block determining circuit is provided prior to the motion vector detection in the MPEG encode whereby a macro block is classified so that the processing is changed in response to a classifying result. However, this method involves the following problems:

1. A classifying by a block determining circuit is of two types alone (non-MC coded and others). Although macro blocks are classified into three types of blocks in MPEG, classification is not performed in connection with Intra where motion vector is not found in previous frames.

2. A determination of the block determining circuit as to whether or not the motion is detected is made in accordance with a simple difference between blocks, which causes the problem about detection precision of a motion vector whose length is 0.

As described above, since the classification of the macro block is insufficient and the classifying method is not effective, the problem remains about a less reduction of the processing and a deterioration of the motion vector detection precision.

SUMMARY OF THE INVENTION

The present invention has been achieved in order to solve the above problems. Therefore, it is an object of the present invention to reduce MPEG encoding. According to the present invention, an input and an output of each block are limited to DCT/DVC data and MPEG data, respectively. Before the DVC data is decoded, the data is classified in accordance with an extent of a motion of a macro block, whereby MPEG encoding is reduced.

According to a first aspect of the present invention, there is provided a motion picture converting apparatus which comprises: input means for capturing an orthogonally transformed digital image signal from an outside; a frame memory for storing an image; block reading means for reading blocks or a macro block from the frame memory in response to a request; region dividing section controlling means for sending a read request to the block reading means; component extracting means for extracting a direct-current component alone of the captured image; two low-resolution frame memories for storing extracted information; motion detecting means for detecting a motion in accordance with the information in the low-resolution frame memories; a region dividing section including macro block classifying means for labeling the macro block in response to a motion detection result by the motion detecting means and label storing means for storing a label of the macro block; decoding means; an encoding section for changing an encoding of the macro block in response to the label in the label storing means; and output means for outward outputting the coded signal. Thus, the macro block is labeled in three types in accordance with the extent of the motion thereof previous to the encoding. The encoding is changed in accordance with the label, whereby a load applied to a motion vector detection is reduced, so that a motion picture conversion is performed at high speed.

According to a second aspect of the present invention, there is provided the motion picture converting apparatus wherein when the label storing means in the first aspect outputs the label indicating that the motion of the macro lock is small, the encoding section selects a small motion vector search area so that a motion vector detection may be performed. Thus, it is possible to improve a motion vector detection precision in the encoding section.

According to a third aspect of the present invention, there is provided the motion picture converting apparatus wherein the region dividing section in the first aspect further includes resolution converting means for converting a resolution by interpolating an input image. Thus, when the resolution of a low-resolution search area is too low for the motion detection due to an insufficient extracting by the component extracting means, the resolution of the data read from the low-resolution frame memory is converted, whereby the resolution of the search area can be improved.

According to a fourth aspect of the present invention, there is provided the motion picture converting apparatus wherein the component extracting means in the first aspect samples the direct-current component and a low-frequency component of the captured image, and the region dividing section includes inverse DCT means for performing an inverse DCT for the low-frequency component extracted by the component extracting means. Thus, since a pattern matching can be performed by the use of a pixel value of an actual image not DCT data, the detection precision can be improved.

According to a fifth aspect of the present invention, there is provided a motion picture converting apparatus which comprises: input means for capturing an orthogonally transformed digital image signal from an outside; a frame memory for storing an image; block reading means for reading blocks or a macro block from the frame memory in response to a request; region dividing section controlling means for sending a read request to the block reading means; component extracting means for extracting a specific component alone resolved by an orthogonal basis from the captured image; inverse orthogonal transform means for performing inverse orthogonal transform with respect to extracted information; two frame memories for storing the information obtained by said inverse orthogonal transform means; motion vector detecting means for detecting a motion in accordance with the information obtained by said inverse orthogonal transform means; a region dividing section including macro block classifying means for labeling said macro block in response to a magnitude of a motion vector output by said motion vector detecting means and label storing means for storing a label of said macro block; decoding means; an encoding section for changing an encoding of said macro block in response to the label in said label storing means; and output means for outward outputting the coded signal. Thus, the motion detection is performed without a high-load processing such as a whole search. The macro block is labeled and the encoding is then changed in accordance with the label, whereby the load applied to the motion vector detection is reduced, so that the motion picture conversion is performed at high speed.

According to a sixth aspect of the present invention, there is provided a motion picture converting apparatus which comprises: input means for inputting a digital image signal constituted of a macro block which is a collection of blocks, each block being orthogonally transformed; a frame memory for storing said digital image signal; block reading means for reading said blocks or said macro block from said frame memory in response to a request; region dividing section controlling means for sending a read request to said block reading means; component extracting means for extracting a direct-current component alone from a captured image; two low-resolution frame memories for storing extracted information; motion detecting means for detecting a motion using the information in said low-resolution frame memories; a region dividing section including macro block classifying means for labeling said macro block in accordance with an output from said motion detecting means, motion vector restoring means for restoring a motion vector of the macro block whose motion is detected in accordance with a result of said motion detecting means, and label storing means for storing a label of said macro block; decoding means; an encoding section including DCT means, quantizing means, variable length coding means, inverse quantizing means, inverse DCT means, frame memory means, an image differentiator, an image adder, a motion vector detecting section in which search area changing means is located, and motion information coding means; and output means for outward outputting the coded signal, wherein said motion vector detecting section in said encoding section limits a motion vector search area in accordance with the motion detection result by said motion detecting means in said region dividing section, whereby a motion vector detection is performed. Thus, a classifying is performed in accordance with the extent of the motion of the macro block. The motion vector of a necessary macro block alone is detected from this classifying result, whereby the load applied to the encoding is reduced, so that the motion picture conversion is performed at high speed.

According to a seventh aspect of the present invention, there is provided the motion picture converting apparatus wherein said region dividing section according to the sixth aspect is replaced by the region dividing section according to the fifth aspect, and said motion vector detecting section in said encoding section limits the motion vector search area by the use of the motion vector detected by said motion vector detecting means in said region dividing section, whereby the motion vector detection is performed. Thus, the motion vector detection is performed at high speed.

According to an eighth aspect of the present invention, there is provided the motion picture converting apparatus wherein said motion vector detecting section in said encoding section is eliminated from said encoding section in the seventh aspect, whereby said encoding section does not detect the motion vector at all but uses the motion vector detected by said motion vector detecting means in said region dividing section. Thus, the load associated with the motion vector detection in the MPEG encoding is removed.

BRIEF DESCRIPTION OF THE DRAWINGS

The object and aspects of the present invention will become more readily apparent from the following detailed description taken in conjunction with the drawings in which:

FIG. 10 is a flow chart showing the flow of the processing to narrow a search area and to detect a motion vector;

FIG. 11 shows an example of an input motion picture image to the motion picture converting apparatus of the third embodiment;

FIG. 12 shows the example of the input motion picture image to a first variation of the motion picture converting apparatus of the third embodiment;

DETAILED DESCRIPTION OF THE PREFERRED EBMODIMENTS

Preferred embodiments of the present invention will be described below with reference to the accompanying drawings.

[Embodiment 1]

Figure 1:
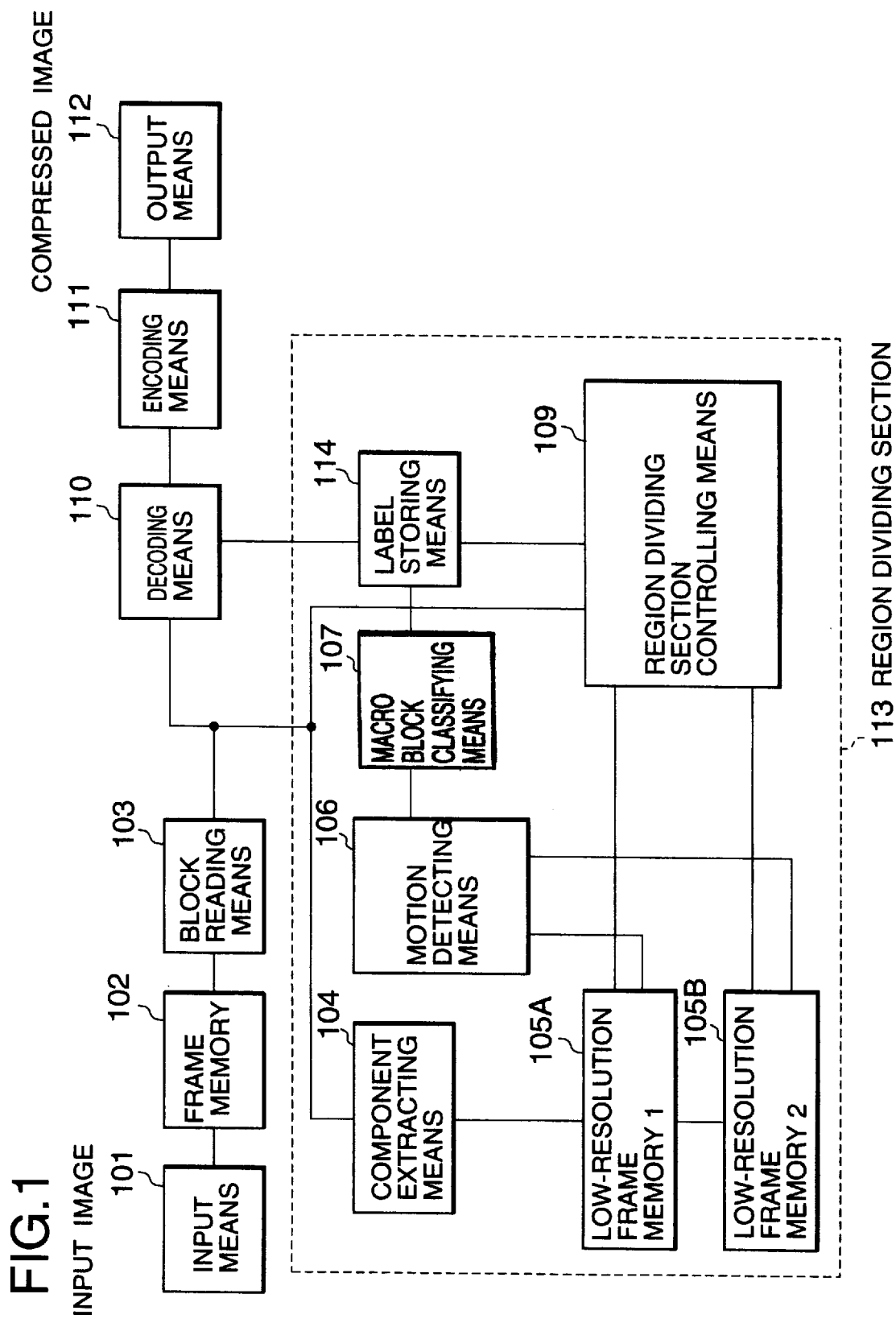
FIG. 1 shows a constitution of a motion picture converting apparatus according to a first embodiment of the present invention.

FIG. 1 shows a constitution of a motion picture converting apparatus according to a first embodiment of the present invention.

Figure 16:
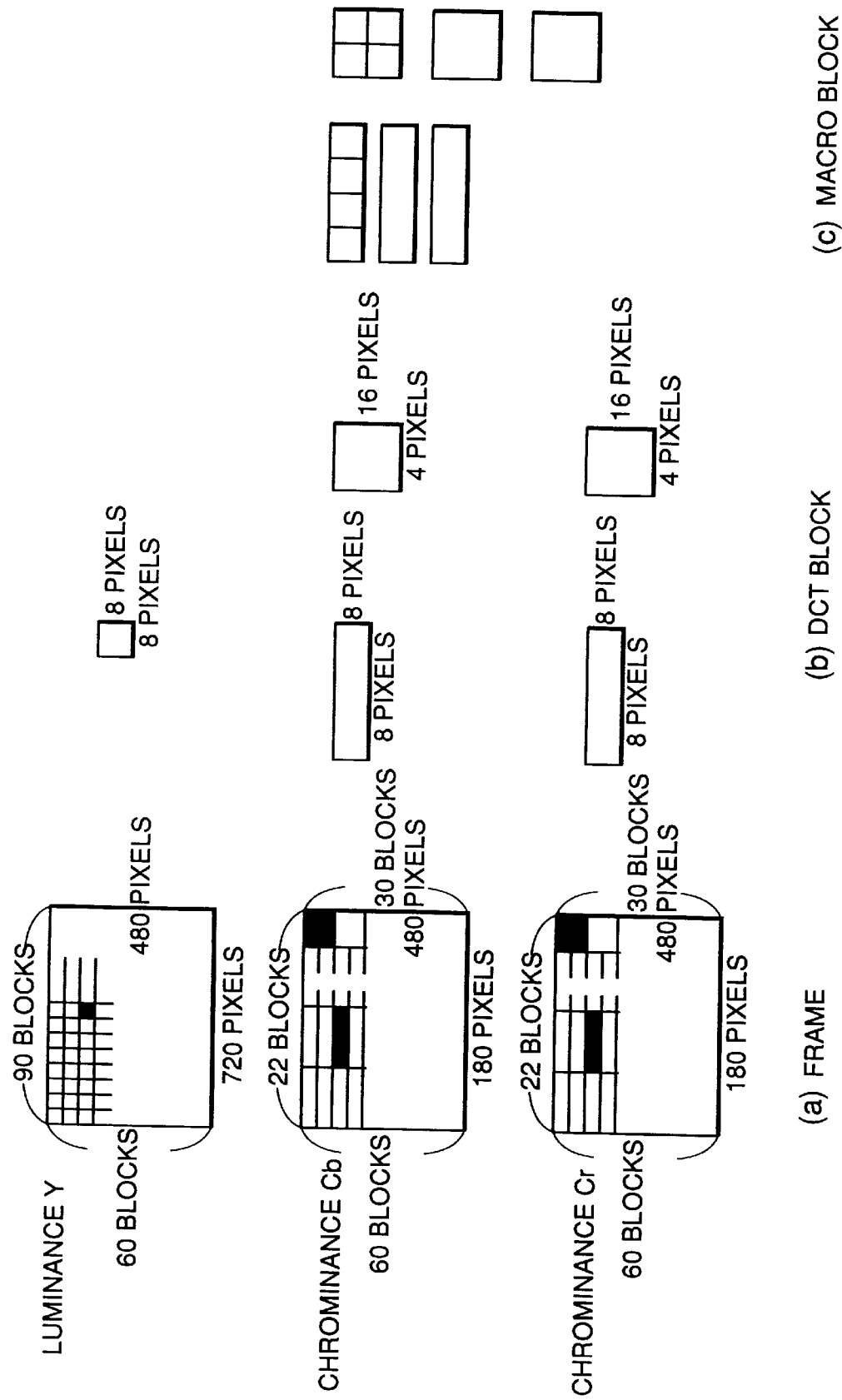
FIG. 16 shows a DVC format of a household digital VTR.
Figure 17:
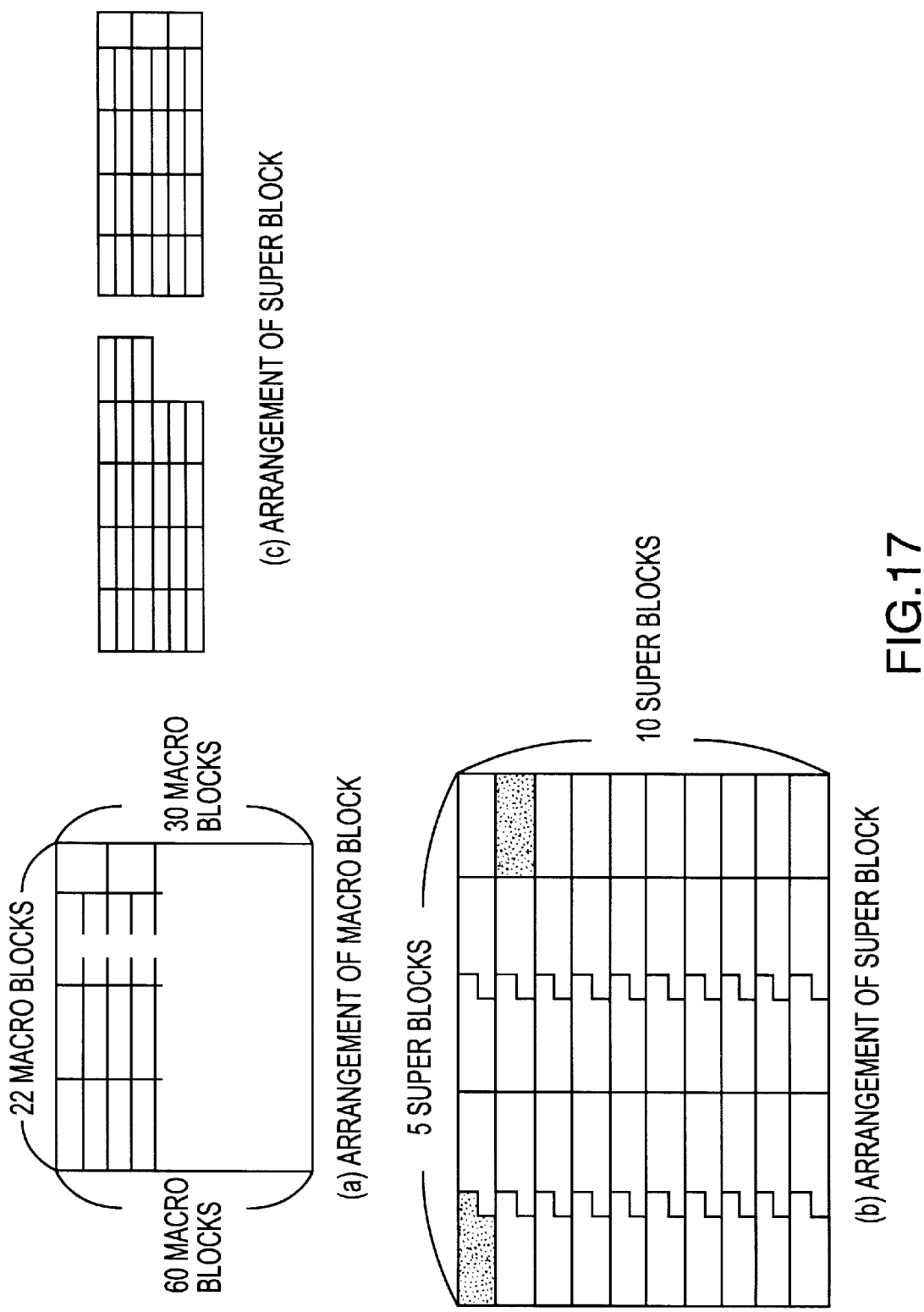
FIG. 17 shows the DVC format of the household digital VTR.
Figure 18:
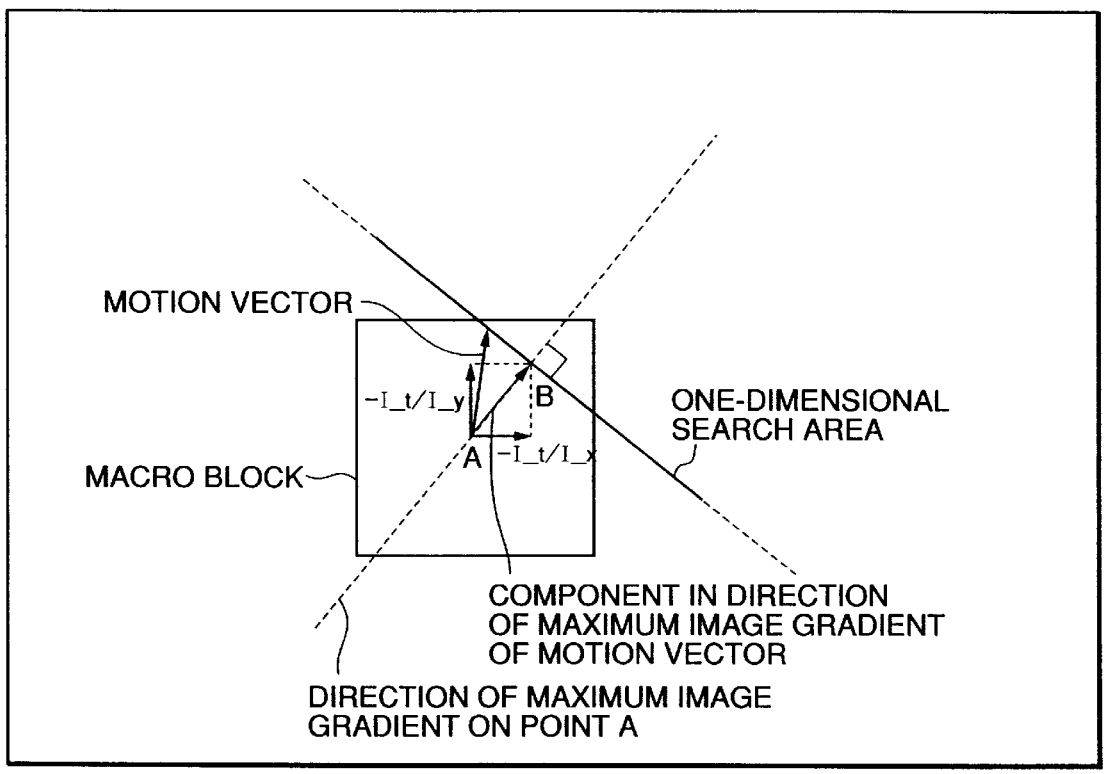
FIG. 18 shows the method of determining the motion vector from a component in a direction of a maximum image gradient of the motion vector.

In the first place, the apparatus of the first embodiment will be described in summary. The apparatus is for converting a DVC-format input image into an MPEG-format image and outputting the converted image. The apparatus is characterized by that a rough motion vector is detected by a macro block unit, a macro block is classified in response to a magnitude of the vector, whereby a processing associated with an image coding is reduced. The DVC format will be described below in brief with reference to FIGS. 16 and 17. FIG. 16(a) shows frames obtained as a result of an extracting of a luminance signal and a chrominance signal in an A/D converting section. A luminance frame is 720×480 pixels in size. A chrominance frame is 180×480 pixels in size. When the frame is divided into small blocks (DCT blocks) for DCT, the luminance frame is divided into 90×60 blocks equal in shape as shown in FIG. 16(a). While, the chrominance frame is divided into blocks in which the blocks are different in shape in the rightmost column alone. FIG. 16(b) shows the block taken out from the frame of FIG. 16(a) and shows a size of each block. A luminance block is 8×8 in size, while a chrominance block is of two sizes of 8×8 and 4×16. Some DCT blocks are together collected, so that the macro block is formed. FIG. 16(c) shows the constitution of the macro block. The macro block comprises four luminance blocks adjacent to each other in a row and two chrominance blocks corresponding to the four luminance blocks. The rightmost macro block comprises four luminance blocks, each luminance block whose two sides are adjacent to the other two luminance blocks, respectively, and two chrominance blocks corresponding to the four luminance blocks.

An arrangement of the macro block in the frame is shown in FIG. 17(a). A collection of 27 macro blocks is referred to as a super block. A single frame has 5-row×10-column super blocks. FIG. 17(b) shows the arrangement of the super blocks in one frame. FIG. 17(c) shows the constitution of the super block constituted of 27 macro blocks. Prior to a data compression, in order to equalize an image quality in a screen after the compression and to distribute an influence of a code error in consideration of a dropout and a particular reproduction, an order of data is changed. This processing is referred to as a shuffling. In the shuffling, one super block is selected from each column, and one macro block is then taken out from each super block, so that one video segment is constituted of five macro blocks. At the time of the compression, the DCT, quantization and variable length coding are controlled so that the data may be always within a predetermined amount in each video segment. Thus, in the DVC format, the DCT is performed for each block, and spatial-direction redundancy is removed.

The constitution of the apparatus of the first embodiment will be described below. Input means 101 for capturing the image from an outside, a frame memory 102 for storing the image and block reading means 103 for reading the blocks or the macro block are connected to each other. Component extracting means 104 for extracting a direct-current component alone of the image, two low-resolution frame memories 105a, 105b for storing extracted information, motion detecting means 106 for detecting a motion using the information in the low-resolution frame memories 105a, 105b, macro block classifying means 107 for labeling the macro block in accordance with an output from the motion detecting means 106, a region dividing section 113 including label storing means 114 and region dividing section controlling means 109, decoding means 110, an encoding section 111 and output means 112 are sequentially connected to each other.

Figure 2:
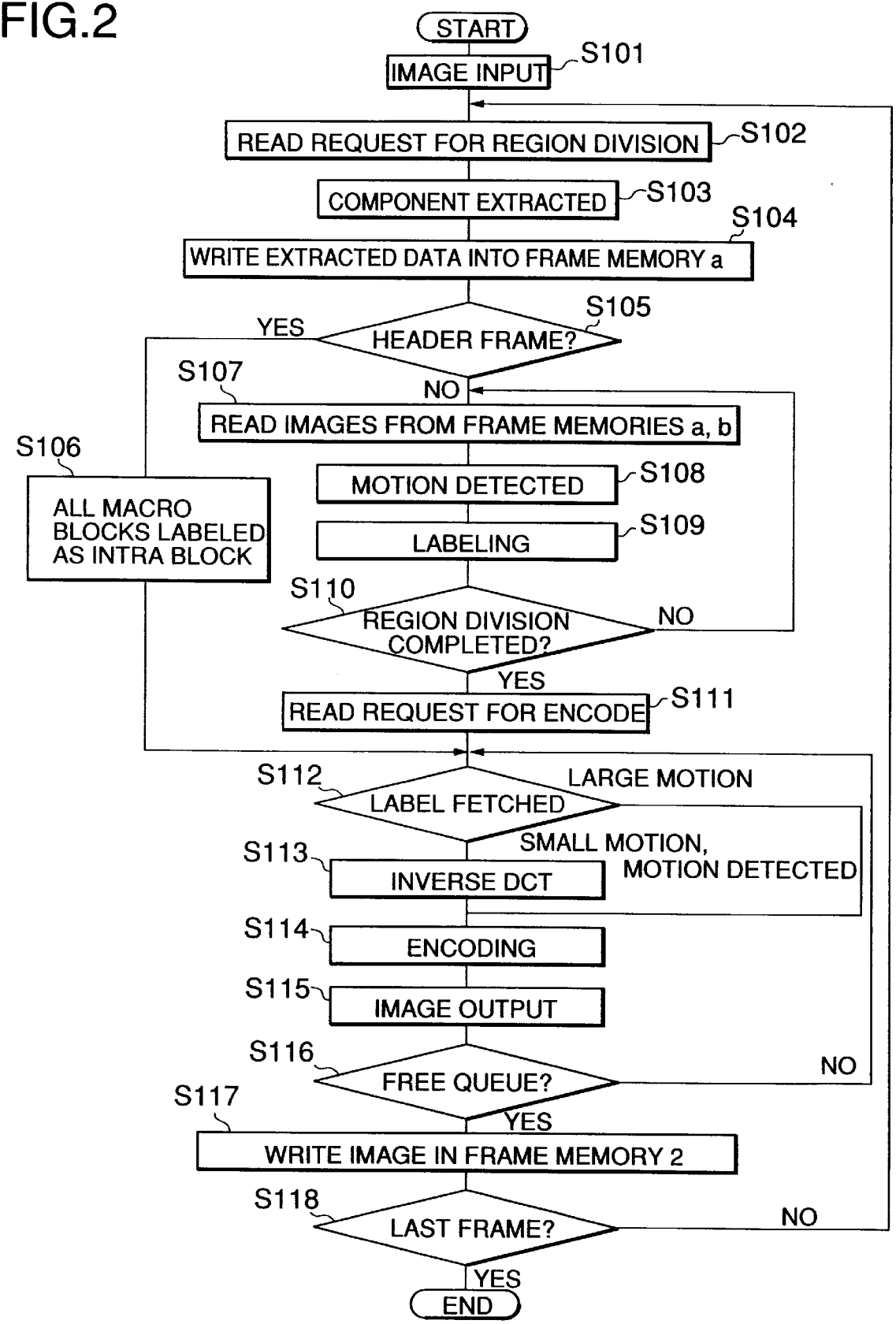
FIG. 2 is a flow chart showing an operation of the whole motion picture converting apparatus of the first embodiment of the present invention.

An operation of the whole apparatus of the first embodiment will be described below with reference to a flow chart of FIG. 2. In the drawing, a step is abbreviated to St.

Step 101: In the first place, the input means 101 writes the DVC-format input image into the frame memory 102.

Step 102: The region dividing section controlling means 109 sends a block read request to the block reading means 103. When the block reading means 103 receives the read request, it sends the image (blocks No. 1 through No. N) to the component extracting means 104.

Step 103: The component extracting means 104 samples the direct-current component alone from each block.

Step 104: The component extracting means 104 writes the extracted data into the low-resolution frame memory 105a in order of extracting.

Step 105: When the image written in the low-resolution frame memory 105a is of a header frame of a motion picture sequence to be processed, Step 106: The region dividing section controlling means 109 determines that all the macro blocks in the frame are intra blocks, and it sends the label indicative of a large motion vector of the macro block to the label storing means 114.

Step 107: When the written image is not the header frame, the motion detecting means 106 reads the current image and the previous image from the low-resolution frame memories 105a and 105b, respectively.

Step 108: The motion detecting means 106 checks the motion of each macro block and outputs the rough motion vector.

Step 109: The macro block classifying means 107 labels the macro blocks in three types of "large motion", "motion detected" and "small motion" in accordance with the magnitude of the rough motion vector. The labels of the macro blocks are sent to the FIFO label storing means 114.

Step 110: The region dividing section controlling means 109 checks a status of a queue in the label storing means 114.

Step 111: When the macro block labels for one frame are stored in the queue, a macro block read request is sent to the block reading means 103. When the block reading means 103 receives the read request, it sends the image (the macro blocks of ID No. 0 through M) to the decoding means 110.

Step 112: When the decoding means 110 receives the macro block of ID No. m from the block reading means 103, it takes out a header label from the queue in the label storing means 114.

Step 113: When the label is indicative of the small motion or the motion detected, an inverse DCT is performed for the macro block of ID No. m. After the macro block is thus restored to the original image, the image is sent to the encoding section 111 together with the label. When the label is indicative of others, nothing is performed for the macro block of ID No. m. The unchanged macro block is then sent to the encoding section 111 together with the label.

Step 114: The encoding section 111 encodes the macro block input from the decoding means 110 in response to the label.

Step 115: The output means 112 outputs the data encoded by the encoding section 111 to the outside of the apparatus.

Step 116: The region dividing section controlling means 109 checks the status of the queue in the label storing means 114.

Step 117: When the labels stored in the queue are used up, the image held in the low-resolution frame memory 105a is written into the low-resolution frame memory 105b.

Step 118: When the current frame is not the last frame of the motion picture sequence to be processed, the region dividing section controlling means 109 subsequently sends the block read request to the block reading means 103 for the next frame processing (step 102).

A method of reading the macro block by the use of the block reading means 103 (step 102) will be described below. Each means of the apparatus of this embodiment uses a block ID which is a serial number from the left upper block to the right lower block in the frame in order to process the frame for each block or macro block. Per frame, the block ID is set to No. 0 through N and the macro block ID is set to No. 0 through M. The block reading means 103 fetches the image from the frame memory for each block or macro block in response to the block or macro block read request from the region dividing section controlling means 109. The blocks of the block ID No. 0 through N or the macro blocks of the macro block ID No. 0 through M are sequentially output.

The method of reading the data by the motion detecting means 106 (step 107) will be described below. The motion detecting means 106 reads a template (2×2 pixels in size) corresponding to the macro block of ID No. m from the low-resolution frame memory 105a. The motion detecting means 106 also reads a low-resolution search area corresponding to the search area of the macro block of ID No. m from the low-resolution frame memory 105b. The motion detecting means 106 performs the motion detection in order of the macro block ID numbers 0 through M in a manner as described below (step 108). When the motion detecting means 106 obtains the template and the low-resolution search area, it starts pattern matching using them. The motion detecting means 106 detects, from a reduction search area, the block of size equal to the template having the highest correlation with the pattern of that template. A sum of absolute difference, a ratio of the template to the search area in a luminance value or the like can be used as the pattern matching. In any case, the motion detecting means 106 is allowed to use a threshold value in deciding correlativity. If the correlativity does not reach the threshold value, the motion detecting means 106 outputs the information indicating an absence of the block highly correlated with the macro block of ID No. m, that is, indicating the motion vector undetected. When the highly correlative block is detected, the motion detecting means 106 defines a center of the search area as an origin and outputs the rough motion vector indicating a position of the detected block. The motion detecting means 106 transmits a packet, including the macro block ID and motion information (the motion vector undetected or the rough motion vector) of the macro block in which the motion detection is performed, to the macro block classifying means 107.

The method of classifying the macro blocks by the macro block classifying means 107 (step 109) will be described below. The macro block classifying means 107 reads the motion information from the packet input from the motion detecting means 106. When the magnitude of the rough motion vector is 0, the label indicative of the small motion is added to the packet. When the rough motion vector is absent, the label indicative of the large motion is added to the packet. In other cases, the label indicative of the motion detected is added to the packet. Then, the macro block classifying means 107 transmits the packet to the label storing means 114. The label storing means 114 adopts a FIFO system, and it thus adds the transmitted packets to the queue in sequence.

Figure 3:
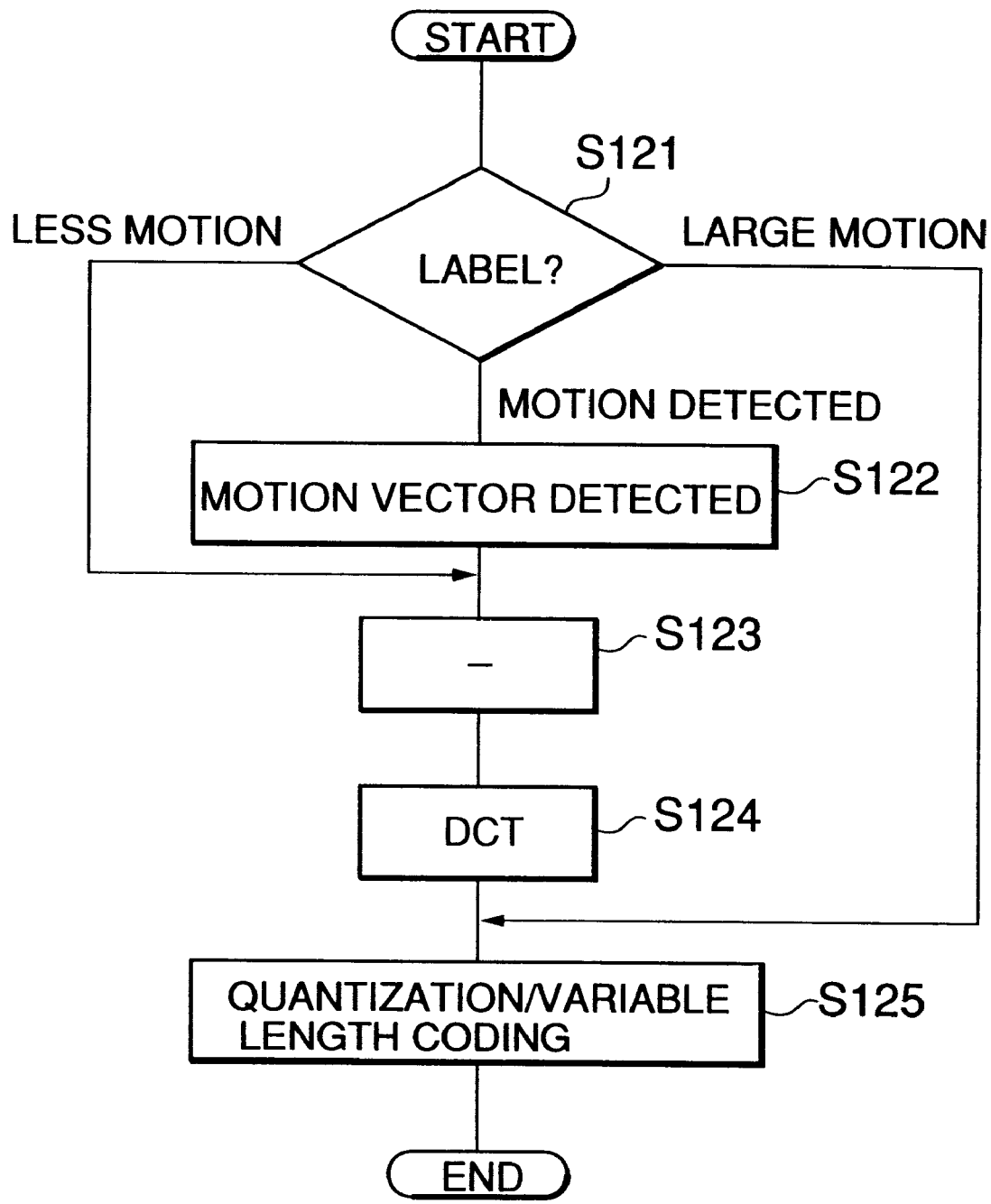
FIG. 3 is a flow chart showing a processing flow in accordance with a difference between labels in an encoding section.

In the encoding section 111, an encoding (step 114) of the macro block input from the decoding means 110 in accordance with the difference between the labels will be described below with reference to the flow chart of FIG. 3.

Step 121: When the macro block label is indicative of the motion detected,

Step 122: The encoding section 111 performs the motion vector detection for the macro block.

Step 123: When the label is indicative of the small motion, the encoding section 111 omits the motion vector detection (step 122). The encoding section 111 calculates the difference between the macro block and the block of size equal to the macro block positioned in the motion vector in the search area. The differential signal is divided into blocks (8×8).

Step 124: The DCT is performed for each block.

Step 125: When the label is indicative of the large motion, the encoding section 111 omits the motion vector detection (step 122), the difference calculation (step 123) and the DCT processing (step 124) and performs the quantization and the variable length coding alone.

Thus, in the apparatus of this embodiment, the region dividing section 113 is provided prior to the encoding, whereby the macro block is classified in accordance with the extent of the motion thereof. The subsequent macro block processing is changed, whereby the load applied to the motion vector detection can be reduced.

In a first variation of the apparatus according to the first embodiment, the encoding section 111 may select the small motion vector search area for the macro block labeled as the small motion so as to perform the motion vector detection. In this case, although the load required for the processing of the macro block labeled as the small motion is increased, a motion vector detection precision is improved as much as an amount of increase. Thus, the difference between the macro block and the block of size equal to the macro block positioned in the motion vector in the search area is reduced, so that a quantization error is reduced.

Figure 4:
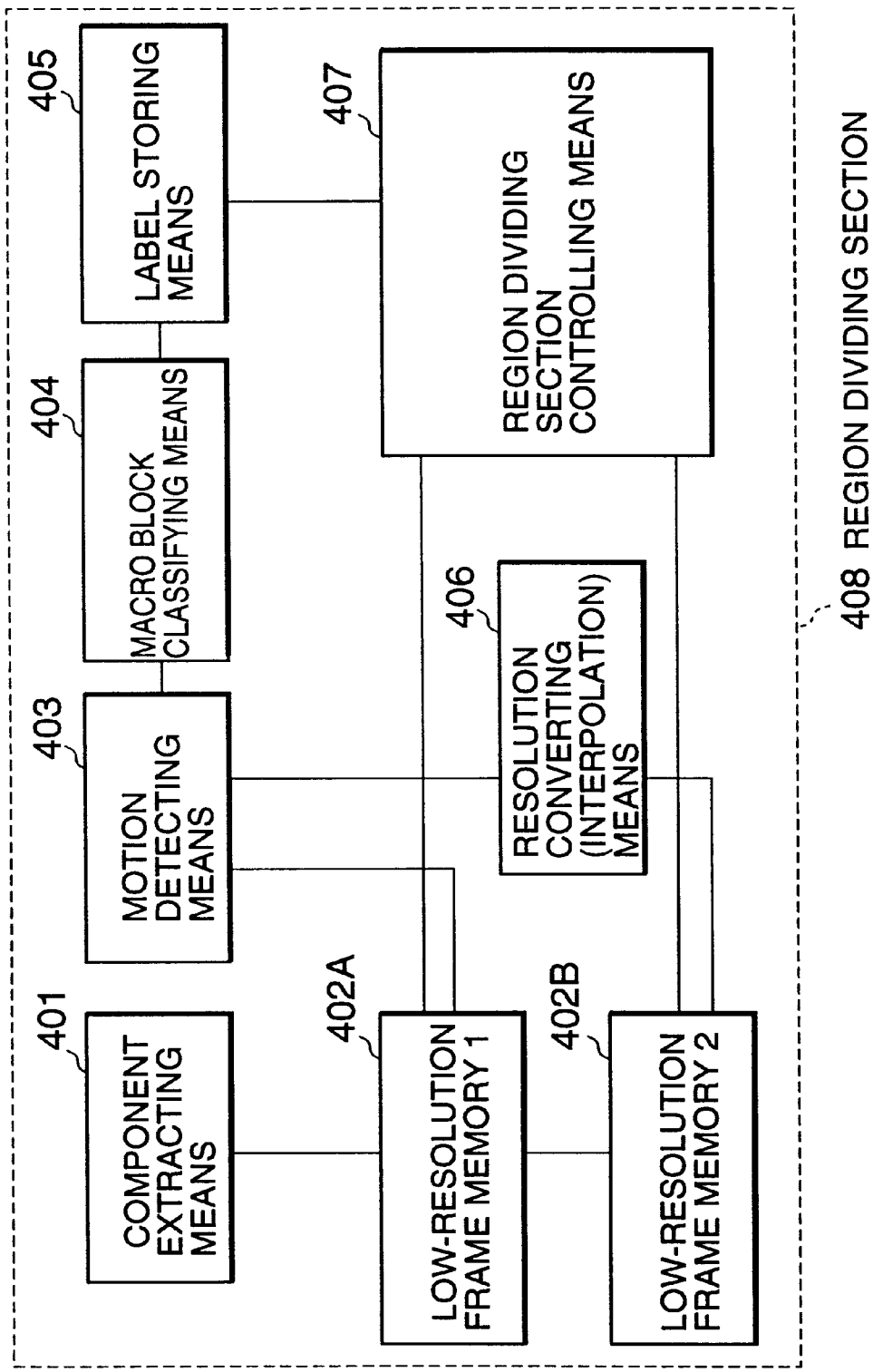
FIG. 4 shows the constitution of a second variation of the motion picture converting apparatus of the first embodiment.

FIG. 4 shows the constitution of a second variation of the region dividing section 113 of the motion picture converting apparatus of the first embodiment. In addition to the constitution of the region dividing section shown in FIG. 1, region dividing section 408 includes region dividing section controlling means 407, low resolution frame memories 402A and 402B, Macro Block Classifying means 404, Label Storing means 405, resolution converting means 406 is located between a low-resolution frame memory 402b and motion detecting means 403. In the resolution converting means 406, a resolution conversion is performed by interpolating the input image. Thus, when the resolution of the low-resolution search area is too low for the motion detection due to an insufficient extracting by component extracting means 401, the resolution of the data read from the low-resolution frame memory 402b is converted, whereby the resolution of the search area can be improved.

In a third variation of the region dividing section of the motion picture converting apparatus of the first embodiment, the inverse DCT means is disposed between the component extracting means 104 and the low-resolution frame memory 105a. The component extracting means 104 samples a low-frequency component as well as the direct-current component. Before the low-frequency component is input to the low-resolution frame memory 105a, the inverse DCT is performed for the low-frequency component by the inverse DCT means, whereby it is possible to form a low-resolution image suitable for the motion detection by the motion detecting means 106. In this case, although the load applied to the calculation by the inverse DCT means is increased, the pattern matching can be performed by the use of a pixel value of an actual image not DCT data, and the resolution can be also changed in accordance with the DCT low-frequency component extracted by the component extracting means 104. Therefore, the detection precision is improved.

Figure 14:
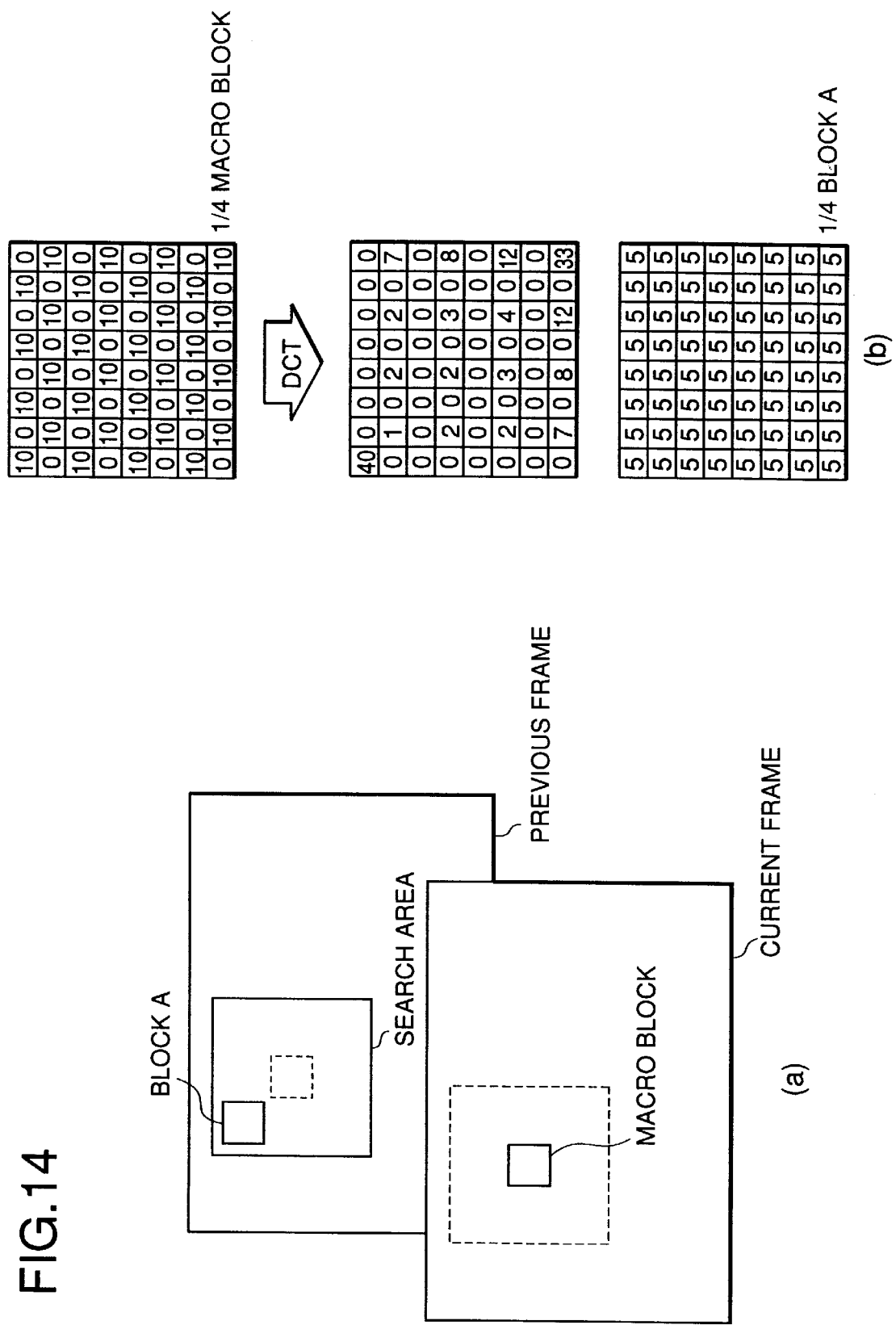
FIG. 14 shows the example of the input motion picture image to the second variation of the motion picture converting apparatus of the first embodiment.
Figure 15:
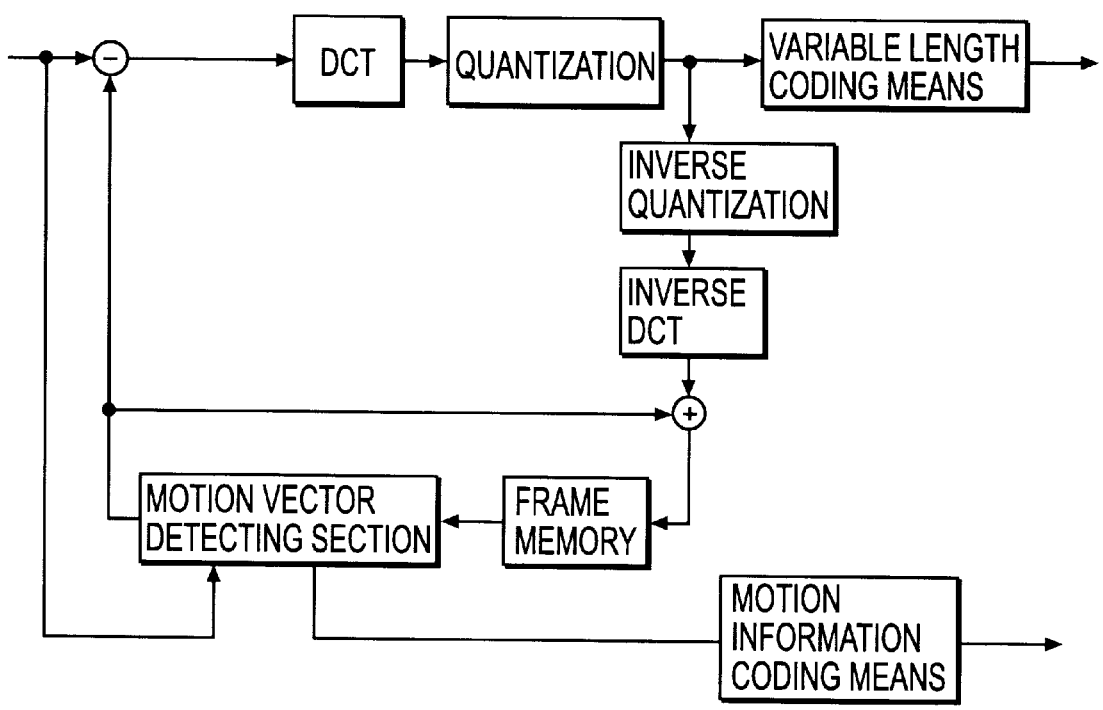
FIG. 15 shows the constitution of a typical MPEG coding apparatus.

Next, as a specific example, consider the input of a motion picture image as shown in FIG. 14(a) into the apparatus of the third variation. In FIG. 14(a), the search area of a certain macro block includes a block A of size equal to the macro block. Both of the macro block and the block A comprise four blocks having equal patterns. A ¼ macro block and a ¼ block A are illustrated in FIG. 14(b). In the ¼ macro block, the pixels of pixel value 10 alternate with the pixels of pixel value 0 in a lattice arrangement. In the ¼ block A, all the pixels have pixel value 5. FIG. 14(b) also shows the ¼ macro block in which the DCT is performed. When such a motion picture image is input to the apparatus of the third variation, the component extracting means 104 samples the DCT low-frequency component, that is, the components substantially equal to 0 except the direct-current component from the macro block. The inverse DCT means performs the inverse DCT, so that the image having a uniform pixel value is formed. Thus, the motion detecting means 106 detects the rough motion vector toward the position of the block A.

As can be seen from the above description, in the apparatus of this embodiment, the region dividing section 113 is provided prior to the encoding in a process of decoding input DVC data and encoding the data into MPEG data, whereby the classifying is performed in accordance with the extent of the motion of the macro block. Since the low-frequency component and/or the direct-current component alone of a DCT coefficient is used for the motion detection, the load applied to the pattern matching is very low. Since much of an image energy is concentrated in the low-frequency component, a precision deterioration is less noticeable than the deterioration in case of the matching using the actual image. In such a manner, since the region dividing section 113 previously classifies each macro block at high speed and the encoding section 111 performs the motion vector detection for the necessary macro block alone in accordance with the classifying result, the processing can be therefore reduced. The apparatus of this embodiment is intended to reduce an encode time in a motion picture format conversion and to accomplish the motion picture format conversion by a software.

[Embodiment 2]

Figure 5:
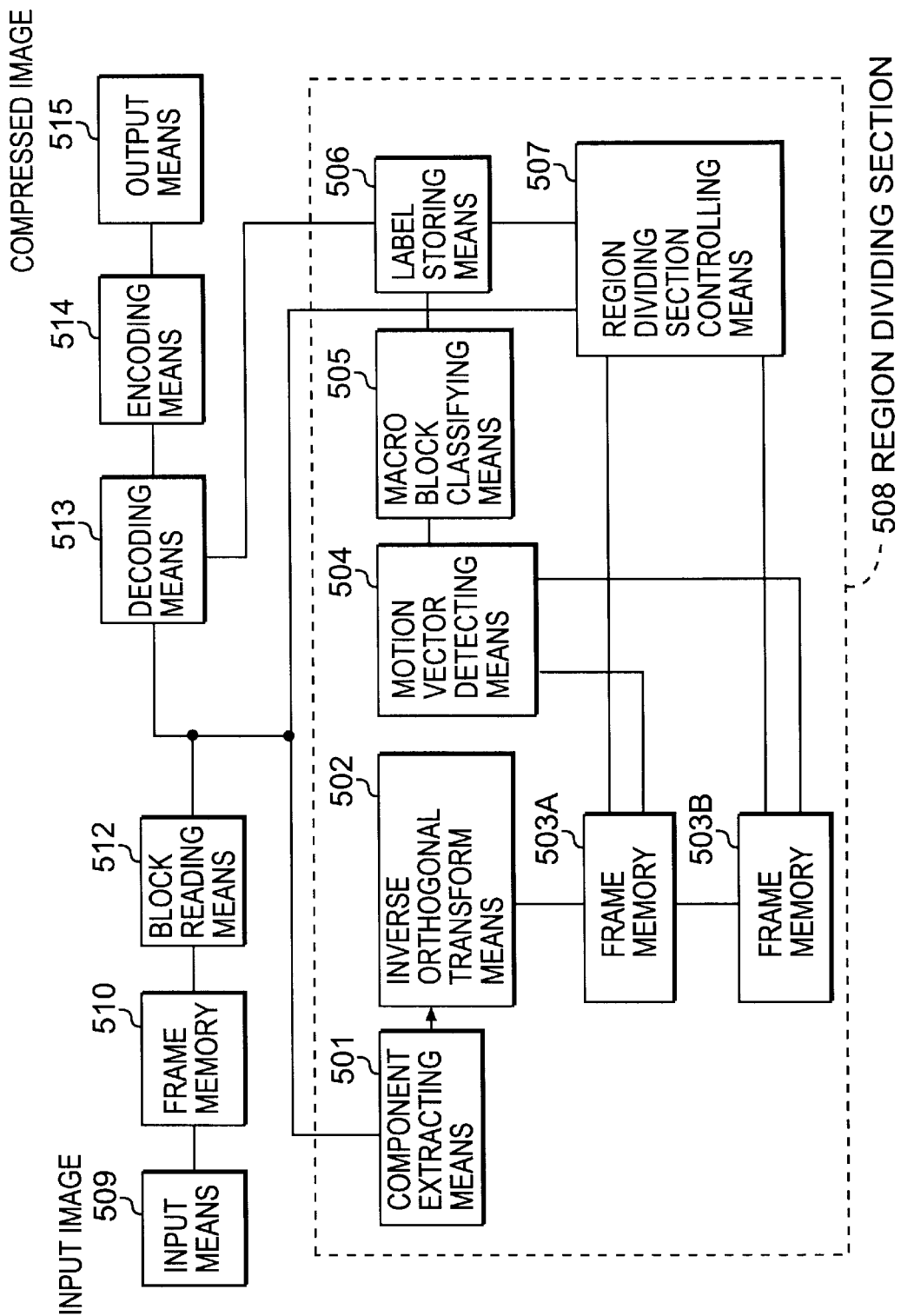
FIG. 5 shows the constitution of the motion picture converting apparatus according to a second embodiment of the present invention.

FIG. 5 shows the constitution of the motion picture converting apparatus according to a second embodiment of the present invention.

In the first place, the apparatus of the second embodiment will be described in summary. The apparatus of this embodiment is for converting the DVC-format input image into the MPEG-format image and outputting the converted image. The apparatus of the second embodiment is different from that of the first embodiment in the constitution of a region dividing section 508. The region dividing section 508 is for detecting the motion of the image and for labeling each macro block in accordance with the magnitude of the motion thereof.

The constitution of the apparatus of this embodiment will be described below. Exclusive of the region dividing section 508, the motion picture converting apparatus of the second embodiment is equal to that of the first embodiment. The region dividing section 508 comprises component extracting means 501 for extracting a specific component alone of the DCT image; inverse orthogonal transform means 502 for performing the inverse DCT for the extracted information; two frame memories 503*a*, 503*b* for storing the image obtained by the inverse orthogonal transform means 502; motion vector detecting means 504 for detecting the motion in accordance with the image obtained by the inverse orthogonal transform means 502; macro block classifying means 505; label storing means 506; and region dividing section controlling means 507. The macro block classifying means 505, the label storing means 506 and the region dividing section controlling means 507 are the same as the macro block classifying means 107, the label storing means 114 and the region dividing section controlling means 109 of the first embodiment, respectively.

Figure 6:
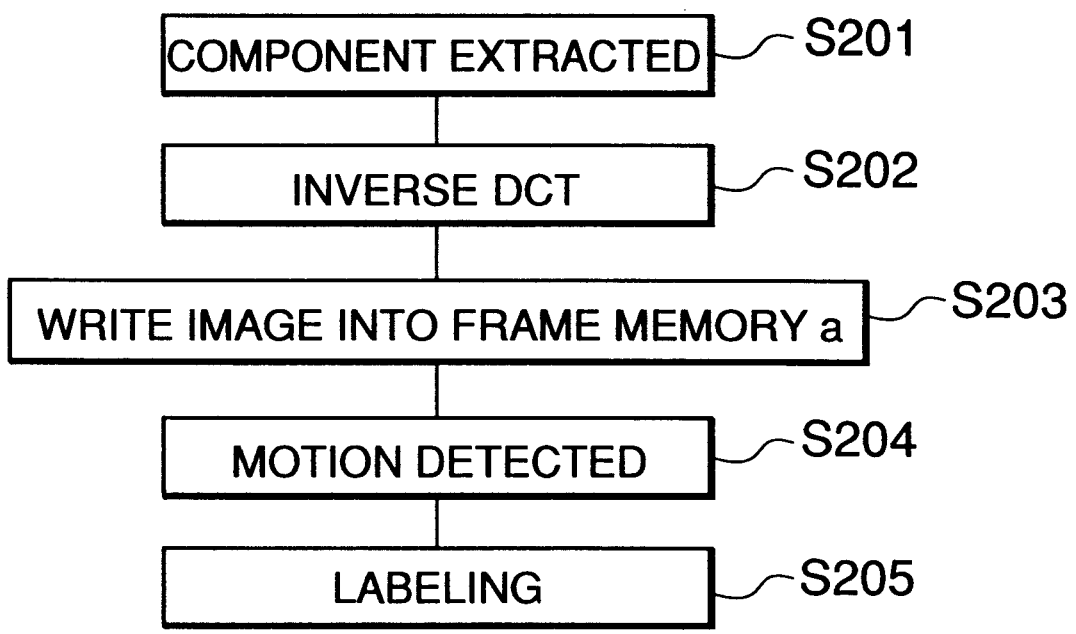
FIG. 6 is a flow chart showing the operation of a region dividing section of the motion picture converting apparatus according to the second embodiment of the present invention.

The operation of the apparatus of this embodiment will be described below. The operation such as the input of the image by input means 509, the read of the block by block reading means 512 the storage of the image by a frame memory 510, the decode by decoding means 513, the encode by an encoding section 514 and the outward output by output means 515 is the same as the operation of the motion picture converting apparatus of the first embodiment. The motion picture converting apparatus of the second embodiment is different from that of the first embodiment in the operation of the region dividing section 508. The operation of the region dividing section 508 will be described below with reference to the flow chart of FIG. 6. This operation corresponds to the operation from a component extracting (step 103) to a labeling (step 109) in the flow chart of FIG. 2 illustrating the whole operation of the motion picture converting apparatus of the first embodiment. In the drawing, the step is abbreviated to St.

Step 201: The component extracting means 501 samples the specific component alone of the image received from the block reading means 512.

Step 202: The inverse orthogonal transform means 502 performs the inverse DCT for the extracted data.

Step 203: The data is sequentially written into each block in the frame memory 503*a*.

Step 204: The motion vector detecting means 504 reads the current image from the frame memory 503*a* and determines a spatial gradient of the image. Next, the previous image is read from the frame memory 503*b*, so that a time-direction gradient of the image is determined. From these two results, the motion vector detecting means 504 obtains a specific-direction component of the motion vector of each block. The specific direction means a direction of a maximum image gradient in the block. The motion vector detecting means 504 performs the pattern matching for a block candidate within a one-dimensional range in accordance with the obtained component in the direction of the maximum gradient of the motion vector, so that it obtains the motion vector. The motion vector detecting means 504 sends the motion vector to the macro block classifying means 505.

Step 205: The macro block classifying means 505 labels the macro block in accordance with the magnitude of the motion vector. The labels are classified in the following manner. That is, if the motion vector exceeds the normal search area of the macro block, the label is indicative of the large motion. If the motion vector is within a predetermined micro region, the label is indicative of the small motion. In other cases, the label is indicative of the motion detected. The labels of the macro blocks are then output to the label storing means 506.

Figure 7:
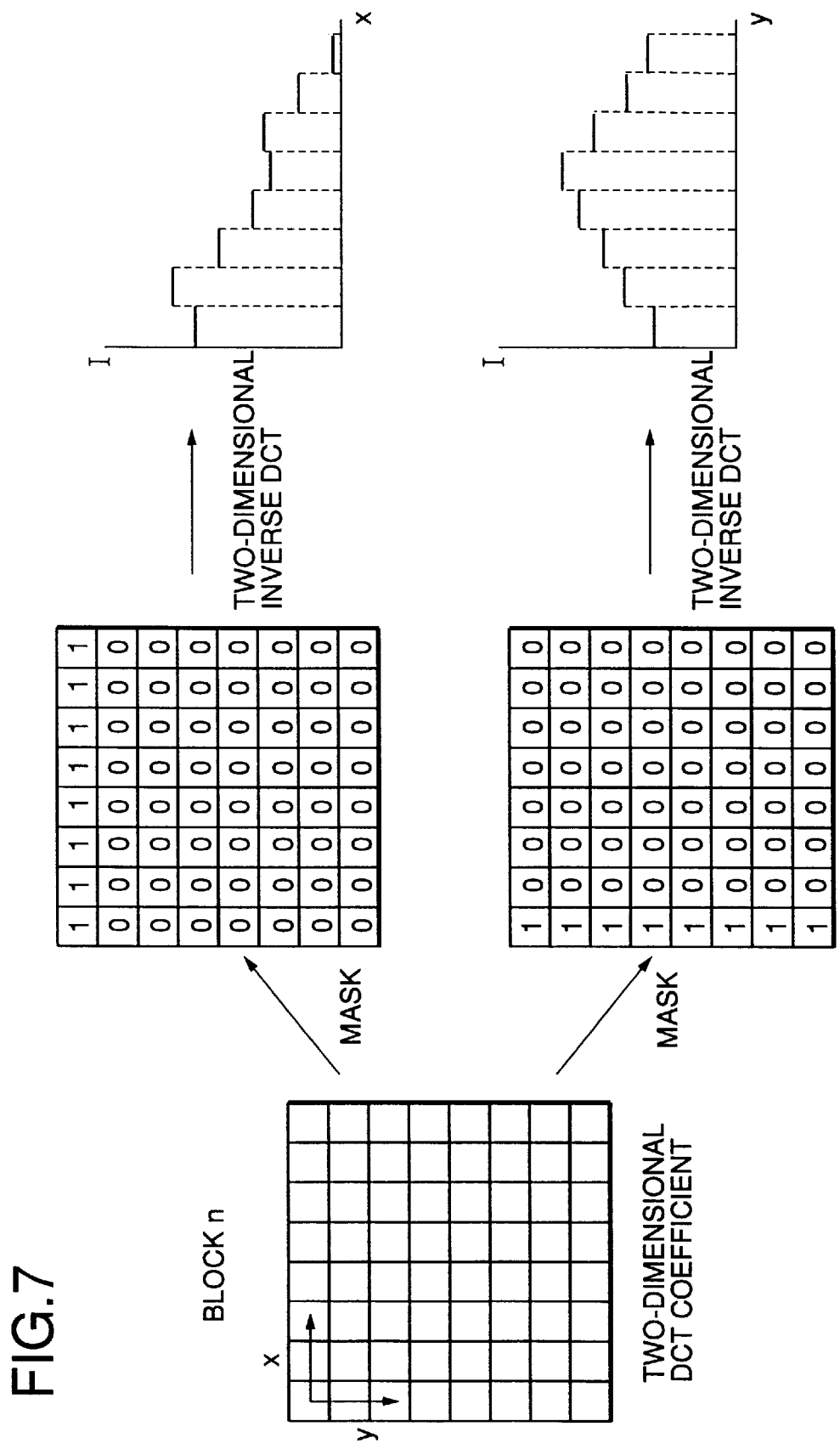
FIG. 7 shows a method of extracting a component from an input image and an inverse DCT method.

The operation of the component extracting means 501 (step 201) and the operation of the inverse orthogonal transform means 502 (step 202) will be described below in detail. The component extracting means 501 sequentially receives the blocks of the block ID numbers 0 through N read by the block reading means 512. FIG. 7 shows the component extracting and the inverse DCT. The left upper block is defined as the origin. As shown in the drawing, a right direction is defined as a positive direction of x-axis, while a downward direction is defined as a positive direction of y-axis. The component extracting means 501 masks the block of ID number n with a mask in which all the components on the x-axis are 1 and the other components are 0. Next, the inverse orthogonal transform means 502 performs a two-dimensional inverse DCT for the masked block. Consequently, as shown in the drawing, the image having no gradient in the y-direction, that is, the image whose cross section taken along a plan surface parallel to the x-axis is equal to the cross section of an optional value of y is output. The image is then written in the frame memory 503*a* (step 203). In FIG. 7, reference symbol I denotes a strength of the image. Next, the component extracting means 501 masks the same block (of ID number n) with the mask in which all the components on the y-axis are 1 and the other components are 0. Then, the inverse orthogonal transform means 502 performs the two-dimensional inverse DCT for the masked block. Consequently, as shown in the drawing, the image having no gradient in the x-direction, that is, the image whose cross section taken along the plan surface parallel to the y-axis is equal to the cross section of an optional value of x is output. The image is then written in the frame memory 503*a* (step 203). Thus, the frame memory 503*a* simultaneously holds the image having no frequency component in the y-direction and the image having no frequency component in the x-direction.

Since the image having no gradient in the y-direction and the image having no gradient in the x-direction have one-dimensional information alone, it is useless to write all the two-dimensional images in the frame memory 503a. Therefore, one-dimensional information in the x-direction and one-dimensional information in the y-direction may be extracted from the image having no gradient in the y-direction and the image having no gradient in the x-direction, respectively, so that the extracted information may be written in the frame memory 503a. Alternatively, in stead of a two-dimensional masking by the component extracting means 501, the inverse orthogonal transform means 502 may perform the one-dimensional inverse DCT for the DCT component located in the position transmitting the mask, whereby each one-dimensional information in the x-direction and the y-direction is obtained.

Figure 8:
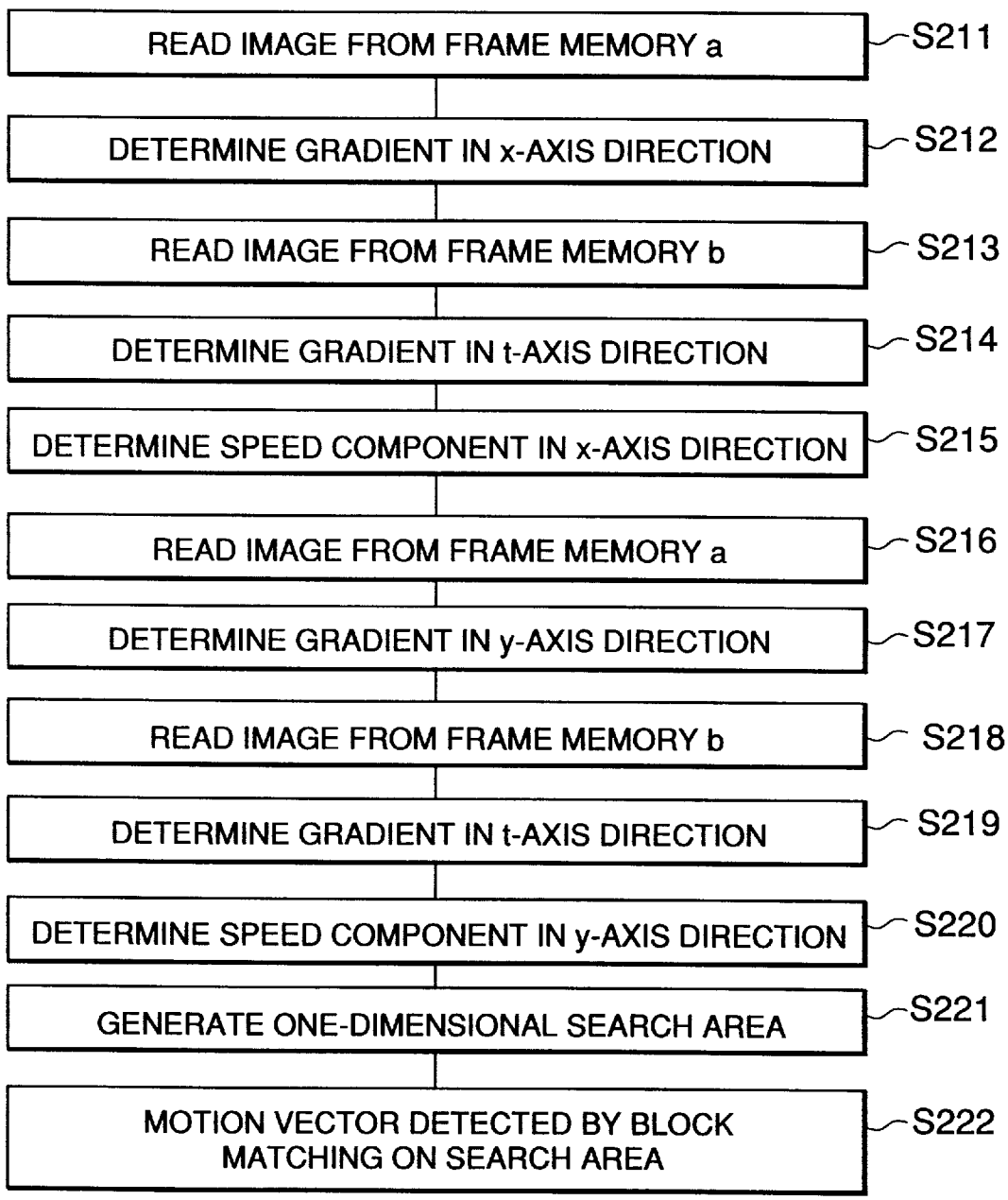
FIG. 8 is a flow chart showing a flow of a motion detection processing of the motion picture converting apparatus according to the second embodiment of the present invention.

A motion detection processing in the motion vector detecting means 504 (step 204) will be described below with reference to the flow chart of FIG. 8.

Step 211: In the first place, the motion vector detecting means 504 reads the image having no gradient in the y-direction corresponding to the macro block of No. m from the frame memory 503a.

Step 212: Next, in the image having no gradient in the y-direction, an attention is paid to a point A at the center of the macro block. A gradient $I\_x$ in the x-direction is calculated from the pixels on a straight line parallel to the x-axis passing through the point A. Reference symbol I denotes the strength of the image. $I\_x$ denotes the gradient of the luminance in the x-direction on the point A and is given by dividing the difference between the luminance values by a distance between the pixels. A calculation result is temporarily held in the motion vector detecting means 504.

Step 213: The motion vector detecting means 504 reads the pixel value located in the position equal to the point A used for determining the gradient in the x-axis direction (step 212) from the image having no gradient in the y-direction of some previous frames stored in the frame memory 503b.

Step 214: The motion vector detecting means 504 calculates a gradient $I\_t$ in the time direction from the read pixel. $I\_t$ denotes a change in the pixel value per frame.

Step 215: The motion vector detecting means 504 calculates $-I\_t/I\_x$ from the gradient $I\_x$ in the x-axis direction and the gradient $I\_t$ in the time direction which are previously held in the motion vector detecting means 504 (step 212). When $I\_x$ is 0, since an image speed is not found in principle, the component in the x-direction is indefinite and an indefinite signal is then output. This value of $-I\_t/I\_x$ represents a speed component in the x-direction of the component in the direction of the maximum image gradient of the motion vector. It can be also said that the value of $-I\_t/I\_x$ represents that the motion vector to be determined is projected in the direction of the maximum image gradient on the point A in the macro block and further projected in the x-axis.

Step 216: Next, the motion vector detecting means 504 reads the image having no gradient in the x-direction corresponding to the macro block of No. m from the frame memory 503a.

Step 217: In the same manner as the calculation of the component in the x-direction (steps 212 through 217), the motion vector detecting means 504 determines a gradient $I\_y$ in the y-axis direction.

Step 218: The motion vector detecting means 504 reads the pixels from the image having no gradient in the x-direction in some previous frames stored in the frame memory 503b.

Step 219: The motion vector detecting means 504 calculates the gradient $I\_t$ in the time direction.

Step 220: The motion vector detecting means 504 calculates the y-direction component $-I\_t/I\_y$. This component in the y-direction is the speed component in the y-direction of the component in the direction of the maximum image gradient of the motion vector of the macro block of ID No. m.

Step 221: Through the above process, the components $(-I\_t/I\_x, -I\_t/I\_y)$ of the motion vector in the direction of the maximum image gradient are obtained. Next, in order to detect the motion vector of the macro block of ID No. m, the motion vector detecting means 504 performs the pattern matching. At this time, the search area is limited to the one-dimensional search area from the previously obtained components of the motion vector in the direction of the maximum image gradient. The one-dimensional search area is a line segment which passes through a point B resulting from an addition of the motion vector component in the direction of the maximum image gradient to a located vector on the point A and has a constant length about the point B on the straight line perpendicular to the direction of the maximum image gradient.

Step 222: The motion vector detecting means 504 performs the pattern matching for the image in the one-dimensional search area and thus obtains the motion vector.

Although the pixel at the center of the macro block is selected as the focus pixel A, any pixel may be selected as long as the pixel is present in the macro block. Furthermore, the gradients in the time and spatial directions may be determined by calculating the simple difference between the pixels or by fitting the straight lines by the use of a method of least square.

As described above, in the apparatus of this embodiment, the region dividing section 508 is provided previous to the encoding in the process of decoding the input DVC data and encoding the data into the MPEG data, whereby the classifying is performed in accordance with the extent of the motion of the macro block. During the motion detection, the specific frequency component alone of the DCT coefficient is used so as to thereby form the image having no frequency component in the y-direction and the image having no frequency component in the x-direction. Then, the component of the motion vector in the direction of the maximum image gradient is calculated from the gradients in the spatial and time axis directions of the images. It is also possible to obtain the motion vector of the macro block from the one-dimensionally limited search area by the pattern matching. The magnitude of the thus obtained motion vector is used for the classifying of the macro block.

In such a manner, since the region dividing section 508 previously classifies each macro block at high speed and the encoding section 514 performs the higher-precision motion vector detection for the necessary macro block alone in accordance with the classifying result, the processing can be therefore reduced. The apparatus of this embodiment is intended to reduce the encode time in the motion picture format conversion and to accomplish the motion picture format conversion by the software.

[Embodiment 3]

Figure 9:
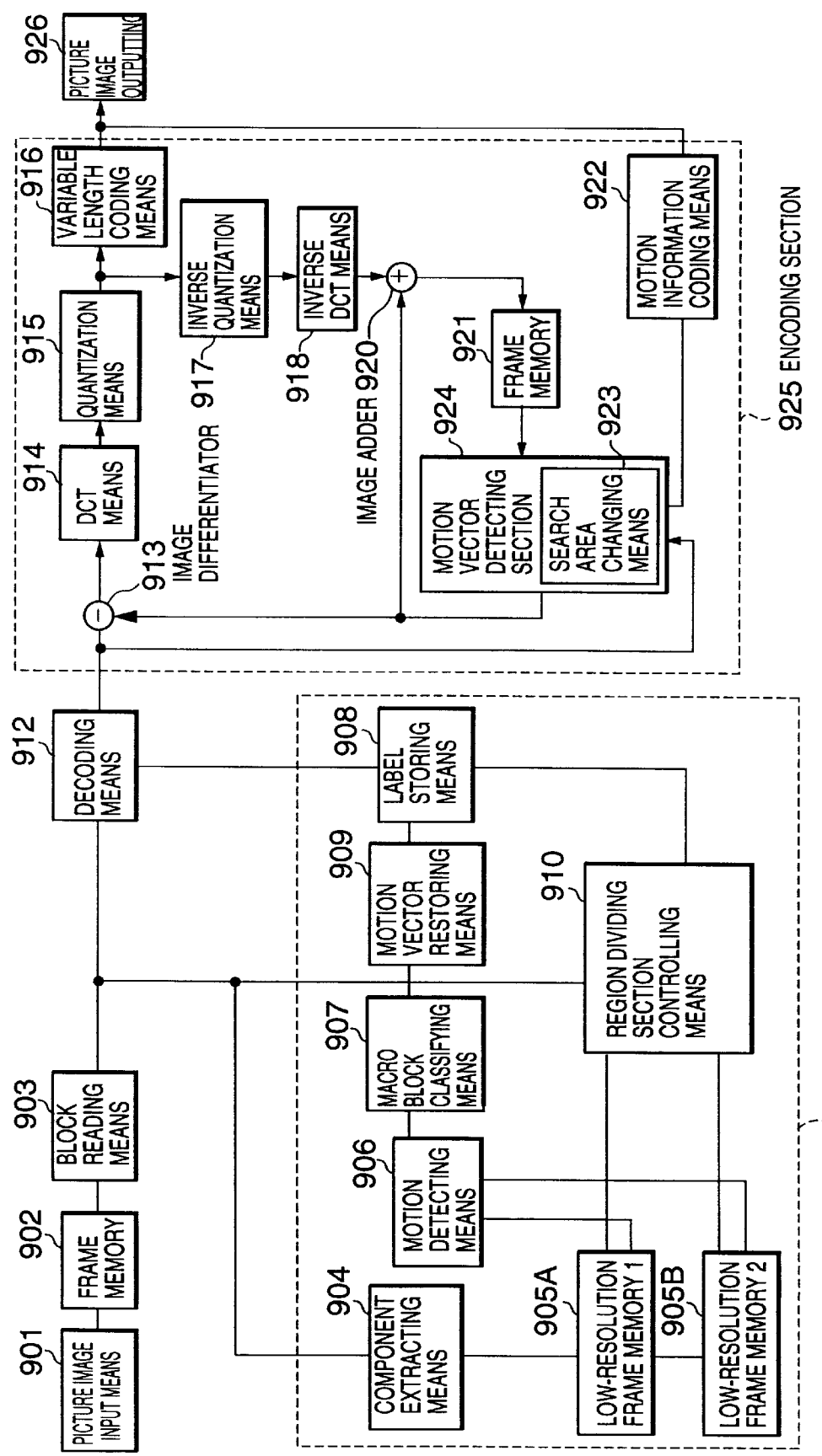
FIG. 9 shows the constitution of the motion picture converting apparatus according to a third embodiment of the present invention.

FIG. 9 shows a third embodiment of the present invention and shows the constitution of the motion picture converting apparatus for performing the motion vector detection at high speed by narrowing the motion vector search area in accordance with the output from the motion detecting means.

For the description of the apparatus of this embodiment, the method of detecting the motion vector will be first described in summary. A motion vector detecting section 924 in an encoding section 925 obtains the motion of the macro block labeled as the motion detected with reference to the previous frame. The motion vector detecting section 924 is characterized by that it limits a motion vector search range in accordance with the output from, more specifically, a region dividing section 911 whereby it performs the motion vector detection.

Next, the constitution of the motion picture converting apparatus of the third embodiment will be further described. Input means 901 for capturing the image from the outside, a frame memory 902 for storing the image and block reading means 903 are connected to each other. Component extracting means 904 for extracting the direct-current component alone of the image; two low-resolution frame memories 905a, 905b for storing the extracted information; motion detecting means 906 for detecting the motion using the information in the low-resolution frame memories 905a, 905b; a region dividing section 911 including macro block classifying means 907 for labeling the macro block in accordance with the output from the motion detecting means 906, motion vector restoring means 909 for restoring the motion vector of the macro block whose motion is detected in accordance with the result of the motion detecting means 906, label storing means 908 and region dividing section controlling means 910 for sending the read request to the block reading means 903 and for controlling elements in the region dividing section 911; decoding means 912; an encoding section 925 including DCT means 914, quantizing means 915, variable length coding means 916, inverse quantizing means 917, inverse DCT means 918, a frame memory 921, an image differentiator 913, an image adder 920, a motion vector detecting section 924, and motion information coding means 922; and output means 926 are connected to each other. Search area changing means 923 is located in the motion vector detecting section 924.

The operation of the motion picture converting apparatus of the third embodiment will be described below. Although a basic operation flow is equal to the flow chart of FIG. 2 illustrating the operation of the apparatus of the first embodiment, the difference between the third and first embodiments is that the motion vector restoring means 909 receives the packet output by the macro block classifying means 907, the rough motion vector is restored to the motion vector and the packet is then transmitted to the label storing means 908. The motion detecting means 906 in the region dividing section 911 detects the rough motion vector of the macro block in the low-resolution search area. Then, the macro block classifying means 907 classifies the macro blocks in accordance with the detected rough motion vector. In the motion picture converting apparatus of the first embodiment, the motion vector of the macro block labeled as the motion detected is searched from the direction of—by the motion vector detecting section in the encoding section 111. On the other hand, the apparatus of the third embodiment is characterized by that the search area is limited in accordance with the rough motion vector obtained by the motion detecting means 906 in the region dividing section 911 whereby the search is performed. The processing to detect the motion vector at high speed by narrowing the motion vector search area will be described with reference to the flow chart of FIG. 10. In the drawing, the step is abbreviated to St.

Step 301: The motion vector restoring means 909 reads the label from the packet input from the macro block classifying means 907.

Step 302: If the label is indicative of the small motion of the large motion, the packet is transmitted to the label storing means 908 with the packet unchanged (step 305). If the read label is indicative of the motion detected, Step 303: the additional motion information (the rough motion vector) is read from the packet, Step 304: the rough motion vector obtained in the low-resolution search area is restored so that it may have the original resolution, whereby the motion information in the packet is updated.

Step 305: The motion vector restoring means 909 transmits the packet to the label storing means 908.

Step 306: When the decoding means 912 receives the macro block of No. m from the block reading means 903, it fetches the header packet from the queue in the label storing means 908. After the decode processing by the label in the apparatus of the first embodiment (step 113), Step 307: if the label is indicative of the small or large motion, the macro block of No. m and the label are sent to the encode section 925. If the label is indicative of the motion detected, Step 308: the motion vector is fetched from the packet, and the macro block of No. m and the label are then sent to the encoding section 925.

Step 309: The search area changing means 923 in the motion vector detecting section 924 determines a new search area so that the new search area may be smaller than the original search area and be included in the original search area about the received motion vector.

Step 310: The motion vector detecting section 924 obtains the motion vector from the newly determined search area.

As described above, in the apparatus of this embodiment, the region dividing section 911 is provided previous to the encoding in the process of decoding the input DVC data and encoding the data into the MPEG data, whereby the classifying is performed in accordance with the extent of the motion of the macro block. Since the encoding section 925 performs the motion vector detection for the necessary macro block alone in accordance with the classifying result, the processing can be therefore reduced. During the motion vector detection, since the motion vector detecting section 924 narrows the search area and performs the search in accordance with the rough motion vector obtained by the motion detecting means 906 in the region dividing section 911, the motion vector can be obtained at high speed. The apparatus of this embodiment is intended to further reduce the encode time and to accomplish the motion picture format conversion by the software, compared to the motion picture converting apparatus of the first embodiment.

Next, as the specific example, consider the input of a motion picture image as shown in FIG. 11 into the apparatus of this embodiment. In FIG. 11, the search area of a certain macro block includes a block A which is equal in size to such a macro block that the sum of all the pixel values in the macro block is equal to the sum of all the pixel values in the block A; and a block B which is equal in size to such a macro block that each pixel value in the block B is less than each pixel value in the macro block by 1. The blocks A and B are separated from each other in the search area. The macro block and the blocks A and B comprise four blocks, each having an equal pattern. The ¼ macro block, ¼ block A and ¼ b lock B are illustrated in FIG. 11. In the ¼ macro block, the pixel values are of 1 through 127 in sequence from the left upper pixel to the right lower pixel so that an arithmetic progression having a common difference of 2 may be made. In the ¼ block A, all the pixels have the pixel value of 64. In the ¼ block B, the pixel values are less than the pixel values in the macro block by 1, that is, the pixel values are of 0 through 126 in sequence from the left upper pixel to the right lower pixel so that the arithmetic progression having the common difference of 2 may be made.

When such a motion picture image is input to the apparatus of this embodiment, the component extracting means 904 samples the direct-current component having quite the same value from the macro block and the block A. The direct-current component of the block B is less than the direct-current component extracted by the component extracting means 904. Thus, the motion detecting means 906 detects the rough motion vector toward the position of the block A. As a result, the motion vector detecting section 924 outputs the motion vector near the detected rough motion vector or cannot detect the motion vector and outputs the information indicating the motion vector is absent.

As the first variation of the motion picture converting apparatus of the third embodiment, the region dividing section 911 is replaced by the region dividing section 508 of the motion picture converting apparatus of the second embodiment. By the use of the motion vector output by the motion vector detecting means 504 in the region dividing section 508, the motion vector search area is narrowed by the motion vector detecting section 924 in the encoding section 925, whereby the motion vector detection can be performed at high speed.

Next, as the specific example, consider the case in which a motion picture 1201 as shown in FIG. 12 is encoded to the DVC data and the DVC data is then input into the apparatus of the first variation. In the motion picture 1201, the macro block is constituted of four blocks A, and the block of size equal to the macro block constituted of four blocks B is separated from the macro block by several pixels in the previous frame. In the block A, all the pixel values in a block column No. 0 are 100, and all the pixel values in a block column No. 1 are 90. In such a manner, as the number of the column is increased, the pixel value is reduced by 10. The block column is herein set so that the leftmost pixel in the block may be defined as the column No. 0 and the next pixel on the right side may be defined as the column No. 1. That is, as the pixel is located on the more right side, one each is sequentially added to the number of the column. A block row is herein set so that the uppermost pixel in the block may be defined as a row No. 0 and the next uppermost pixel may be defined as a row No. 1. That is, as the pixel is located on the lower side, one each is sequentially added to the number of the row. In the block B, the pixels have the same value in the block rows No. 0, 2, 4 and 6. In the value of the row, the value of the block B is twice that of the block A. That is, in such a manner that the values are 200 and 180 in the columns No. 0 and No. 1, respectively, as the number of the column is increased, the value is reduced by 20. The pixel values are 0 in the block rows No. 1, 3, 5 and 7.

The DCT is performed for the blocks A and B, and the blocks A and B are masked with the mask in which the pixel values are 1 in the block row No. 0 and the pixel values are 0 in the other rows, whereby the inverse DCT is performed. This result is shown in the right illustrations of FIG. 12. Although both the data have little correlation with each other in the pattern matching of the data before processed, both the data is equal after the processing by the apparatus of this variation. The motion vector detecting means 504 of the apparatus of this variation uses the data shown on the right side of FIG. 12 during determining the image speed in the x-axis direction. Since both the data have the same gradient in the x-axis direction, the motion vector detecting means 504 outputs, as an x component of the component in the direction of the maximum image gradient of the motion vector, the value of the same place as the difference between the macro block and the block constituted of the four blocks B in the position on the x-axis.

In case of a y component of the component in the direction of the maximum image gradient of the motion vector, since I_y is 0, the indefinite signal is output. However, since the magnitude of the motion vector is equal to or more than the value output as the x component of the component in the direction of the maximum image gradient of the motion vector, this macro block label is labeled as the motion detected.

As the second variation of the motion picture converting apparatus of the third embodiment, the motion vector detecting section 924 is removed from the encoding section 925, and it is also possible to use the as-unchanged motion vector detected by the motion vector detecting means 504 in the region dividing section 508. In this case, the load associated with the motion vector detection in the encoding section 925 is eliminated, and the processing is reduced.

Figure 13:
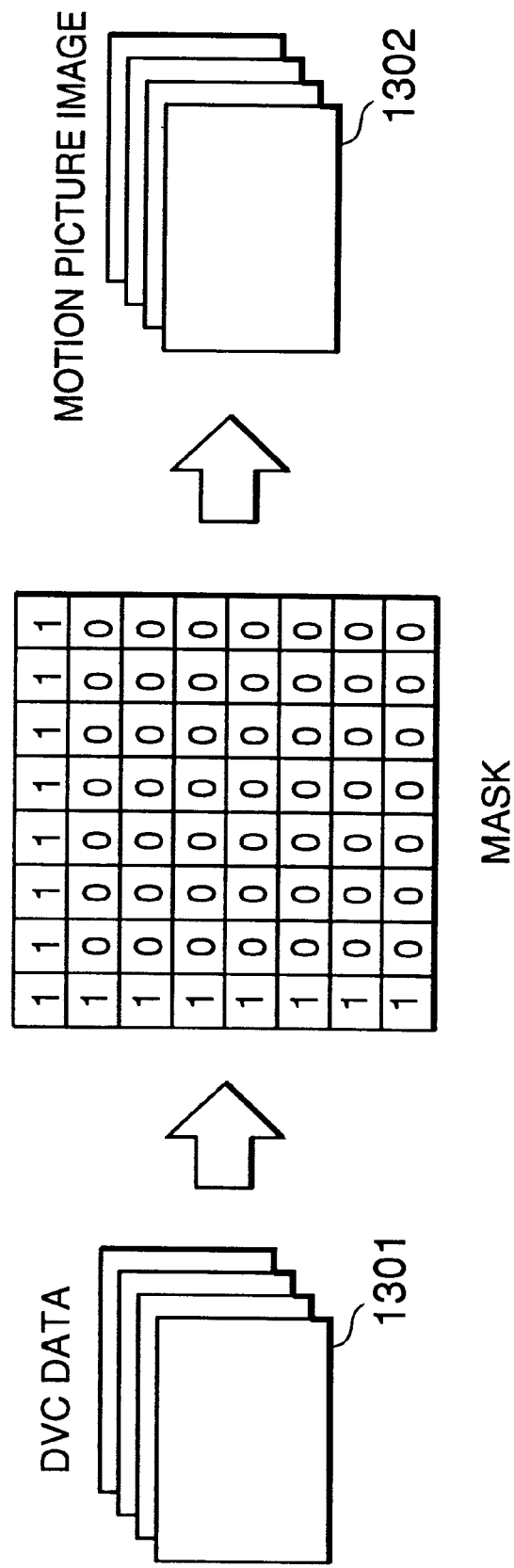
FIG. 13 shows the example of the input motion picture image to the second variation of the motion picture converting apparatus of the third embodiment.

Next, as the specific example, consider the input of a motion picture image 1302 as shown in FIG. 13 into the apparatus of this variation. In each block in DVC data 1301, assuming that the left upper block is defined as the origin, the right direction is defined as the positive direction of the x-axis and the downward direction is defined as the positive direction of the y-axis, the motion picture image 1302 is masked with the mask in which the components on the x-axis and y-axis are 1 and the other components are 0. When the motion picture image 1302 is input to the apparatus of this variation, the motion vector detecting means 504 outputs the motion vector which is the same as the motion vector when the DVC data is input to the motion vector detecting means 504. Thus, the motion vector detecting section 924 can use the as-unchanged motion vector output by the means 504 as the motion vector without determining the additional motion vector.

As can be seen from the above description, in the apparatus of this embodiment, the region dividing section 911 is provided previous to the encoding in the process of decoding the input DVC data and encoding the data into the MPEG data, whereby the classifying is performed in accordance with the extent of the motion of the macro block. Since the encoding section 925 performs the motion vector detection for the necessary macro block alone in accordance with the classifying result, the processing can be therefore reduced. During the motion vector detection, the motion vector detecting section 924 narrows the search area and searches the motion vector in accordance with the motion vector obtained by the motion vector detecting means 504 in the region dividing section 508. Therefore, the motion vector detecting section 924 does not determine the motion vector and uses, as the motion vector, the as-unchanged motion vector obtained by the motion vector detecting means 504 in the region dividing section 508, whereby the motion vector can be obtained at high speed. The apparatus of this embodiment is intended to further reduce the encode time and to accomplish the motion picture format conversion by the software, compared to the motion picture converting apparatus of the second embodiment.

As described above, a macro block is classified by a region dividing section provided by the present invention prior to an image compression processing, and an encoding is changed in response to this classifying result, whereby an amount of operation for a motion vector detection can be reduced and a speed of the image compression processing can be improved.

Various modifications and variations of the embodiments described in the above may be made without departing from the invention defined by the following claims.

What is claimed is:

1. A motion picture converting apparatus comprising:
   input means for inputting a digital image signal constituted of a macro block which is an aggregation of blocks, each block being orthogonally transformed;

a frame memory for storing said digital image signal;

block reading means for reading said blocks or said macro block from said frame memory in response to a request;

region dividing section controlling means for sending a read request to said block reading means;

component extracting means for extracting a direct-current component alone of a captured image;

two low-resolution frame memories for storing extracted information;

motion detecting means for detecting a motion using the information in said low-resolution frame memories;

a region dividing section including:
  macro block classifying means for labeling said macro block in response to a motion detection result by said motion detecting means, and
  label storing means for storing a label of said macro block;

decoding means;

an encoding section for changing an encoding of said macro block in response to the label in said label storing means to produce a coded signal; and output means for outputting the coded signal.

2. The motion picture converting apparatus according to claim 1, wherein when said label storing means outputs the label indicating that the motion of said macro block is small, said encoding section selects a small search area for motion vector so that a motion vector detection is performed.

3. The motion picture converting apparatus according to claim 1, wherein said region dividing section further includes resolution converting means for converting a resolution by interpolating an input image.

4. The motion picture converting apparatus according to claim 1, wherein said component extracting means samples the direct-current component and a low-frequency component of the captured image, and
  said region dividing section includes inverse DCT means for performing an inverse DCT for the low-frequency component extracted by said component extracting means.

5. A motion picture converting apparatus comprising:

input means for inputting a digital image signal constituted of a macro block which is a collection of blocks, each block being orthogonally transformed;

a frame memory for storing said digital image signal;

block reading means for reading said blocks or said macro block from said frame memory in response to a request;

region dividing section controlling means for sending a read request to said block reading means;

component extracting means for extracting a specific component alone resolved by an orthogonal basis from a captured image;

inverse orthogonal transform means for performing inverse orthogonal transform with respect to extracted information;

two frame memories for storing the information obtained by said inverse orthogonal transform means;

motion vector detecting means for detecting a motion in accordance with the information obtained by said inverse orthogonal transform means;

a region dividing section including:
  macro block classifying means for labeling said macro block in response to a magnitude of a motion vector output by said motion vector detecting means, and
  label storing means for storing a label of said macro block;

decoding means;

an encoding section for changing an encoding of said macro block in response to the label in said label storing means to produce a coded signal and output means for outputting the coded signal.

6. A motion picture converting apparatus comprising:

input means for inputting a digital image signal constituted of a macro block which is a collection of blocks, each block being orthogonally transformed;

a frame memory for storing said digital image signal;

block reading means for reading said blocks or said macro block from said frame memory in response to a request;

region dividing section controlling means for sending a read request to said block reading means;

component extracting means for extracting a direct-current component alone from a captured image;

two low-resolution frame memories for storing extracted information;

motion detecting means for detecting a motion using the information in said low-resolution frame memories;

a region dividing section including:
  macro block classifying means for labeling said macro block in accordance with an output from said motion detecting means,
  motion vector restoring means for restoring a motion vector of the macro block whose motion is detected, in accordance with a result of said motion detecting means, and
  label storing means for storing a label of said macro block;

decoding means;

an encoding section including:
  DCT means,
  quantizing means,
  variable length coding means,
  inverse quantizing means,
  inverse DCT means,
  frame memory means,
  an image differentiator,
  an image adder,
  a motion vector detecting section in which search area changing means is located, and
  motion information coding means; and output means for outputting a coded signal, wherein said motion vector detecting section in said encoding section determines a search area for motion vector in accordance with the motion detection result by said motion detecting means in said region dividing section, whereby a motion vector detection is performed.

7. The motion picture converting apparatus according to claim 6, wherein
  said motion vector detecting section in said encoding section determines the search area for motion vector by a use of the motion vector detected by said motion vector detecting means in said region dividing section, whereby the motion vector detection is performed.

8. The motion picture converting apparatus according to claim 7, wherein said motion vector detecting section in said encoding section is eliminated from said encoding section, whereby said encoding section does not detect the motion vector at all but uses the motion vector detected by said motion vector detecting means in said region dividing section.

* * * * *